US008629989B2

(12) United States Patent
Kobayashi et al.

(10) Patent No.: US 8,629,989 B2

(45) Date of Patent: Jan. 14, 2014

(54) COORDINATE INPUT APPARATUS, LIGHT RECEIVING APPARATUS OF THE COORDINATE INPUT APPARATUS, AND MANUFACTURING METHOD OF THE SAME

(75) Inventors: Katsuyuki Kobayashi, Yokohama (JP); Yuichiro Yoshimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 13/161,318

(22) Filed: Jun. 15, 2011

(65) Prior Publication Data

US 2012/0002217 A1 Jan. 5, 2012

(30) Foreign Application Priority Data

Jun. 30, 2010 (JP) ................................ 2010-150253

(51) Int. Cl.

*G01B 11/14* (2006.01)
*B23P 17/04* (2006.01)
*G09G 5/00* (2006.01)

(52) U.S. Cl.

USPC ............. 356/622; 356/614; 29/428; 345/173; 345/175

(58) Field of Classification Search

USPC .......... 356/614, 622; 345/173, 175, 901, 902; 178/18.01, 18.03, 18.04, 18.05, 18.06, 178/18.07; 250/227.11, 227.14; 29/428

See application file for complete search history.

(56) References Cited

U.S. PATENT DOCUMENTS 4,507,557 A * 3/1985 Tsikos ....................... 250/341.7
4,820,050 A * 4/1989 Griffin .......................... 356/621
4,886,943 A 12/1989 Suzuki et al.
4,931,965 A 6/1990 Kaneko et al.
4,980,518 A 12/1990 Kobayashi et al.
5,070,325 A 12/1991 Tanaka et al.
5,097,102 A 3/1992 Yoshimura et al.
5,097,415 A 3/1992 Yoshimura et al.
5,142,106 A 8/1992 Yoshimura et al.
5,239,138 A 8/1993 Kobayashi et al.
5,317,140 A * 5/1994 Dunthorn ...................... 250/221
5,499,098 A * 3/1996 Ogawa .......................... 356/621
5,500,492 A 3/1996 Kobayashi et al.
5,539,678 A 7/1996 Tanaka et al.

(Continued)

FOREIGN PATENT DOCUMENTS

JP 2001-84090 A 3/2001
JP 2001-105671 A 4/2001

(Continued)

OTHER PUBLICATIONS

U.S. Appl. No. 13/210,268, filed Aug. 15, 2011. Applicant: Yuichiro Yoshimura.

*Primary Examiner* — Sang Nguyen

(74) *Attorney, Agent, or Firm* — Fitzpatrick, Cella, Harper & Scinto

(57) ABSTRACT

A light receiving unit of a coordinate input apparatus includes a light receiving element, a light receiving lens, an adjusting unit for adjusting the positional relationship between the light receiving element and light receiving lens, and a light transmissive plate which is arranged between the light receiving element and light receiving lens, and defines the focal length of the light receiving lens. The light transmissive plate is arranged between the light receiving element and light receiving lens in a state in which the optical axis between the light receiving element and light receiving lens is adjusted by the adjusting unit with the light transmissive plate being removed.

9 Claims, 14 Drawing Sheets

(56) References Cited

U.S. PATENT DOCUMENTS

| | | | | |
|---|---|---|---|---|
| 5,565,893 | A | 10/1996 | Sato et al. | |
| 5,714,698 | A | 2/1998 | Tokioka et al. | |
| 5,726,686 | A | 3/1998 | Taniishi et al. | |
| 5,736,979 | A | 4/1998 | Kobayashi et al. | |
| 5,805,147 | A | 9/1998 | Tokioka et al. | |
| 5,818,429 | A | 10/1998 | Tanaka et al. | |
| 5,831,603 | A | 11/1998 | Yoshimura et al. | |
| 5,936,207 | A | 8/1999 | Kobayashi et al. | |
| 6,352,351 | B1 * | 3/2002 | Ogasahara et al. | 362/613 |
| 6,415,240 | B1 | 7/2002 | Kobayashi et al. | |
| 6,421,042 | B1 * | 7/2002 | Omura et al. | 345/157 |
| 6,570,103 | B1 * | 5/2003 | Saka et al. | 178/18.01 |
| 6,654,007 | B2 | 11/2003 | Ito | |
| 6,862,019 | B2 | 3/2005 | Kobayashi et al. | |
| 6,867,872 | B1 | 3/2005 | Kurihara et al. | |
| 6,952,202 | B2 * | 10/2005 | Hirabayashi | 345/175 |
| 7,075,524 | B2 | 7/2006 | Kobayashi et al. | |
| 7,113,174 | B1 * | 9/2006 | Takekawa et al. | 345/173 |
| 7,486,281 | B2 | 2/2009 | Kobayashi et al. | |
| 7,557,935 | B2 * | 7/2009 | Baruch | 356/614 |
| 2001/0019325 | A1 * | 9/2001 | Takekawa | 345/157 |
| 2002/0050985 | A1 * | 5/2002 | Takekawa et al. | 345/173 |
| 2004/0061689 | A1 * | 4/2004 | Ito | 345/175 |
| 2008/0204415 | A1 * | 8/2008 | Jung et al. | 345/166 |

FOREIGN PATENT DOCUMENTS

| | | | | |
|---|---|---|---|---|
| JP | 2001-142642 | A | | 5/2001 |
| JP | 2001-282445 | A | | 10/2001 |
| JP | 2004-185283 | A | | 7/2004 |
| JP | 2005-78433 | A | | 3/2005 |
| JP | 2006059153 | A | * | 3/2006 |

* cited by examiner

FIG. 12A
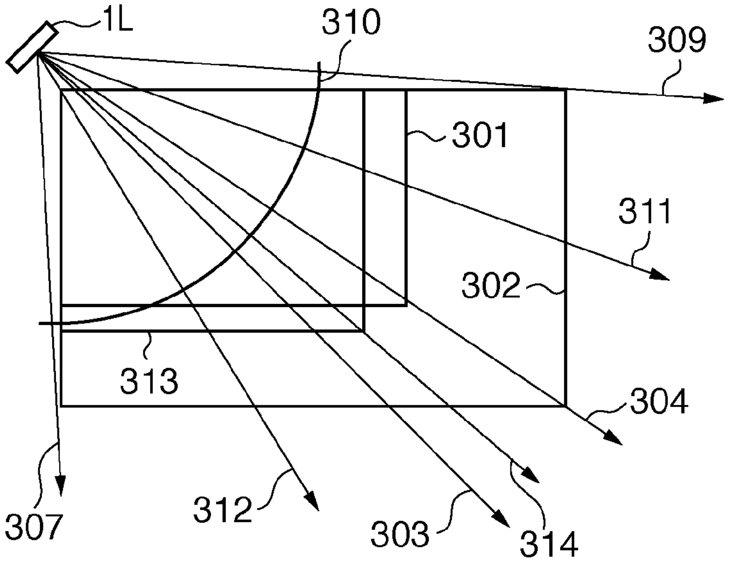
FIG. 12B
FIG. 12C
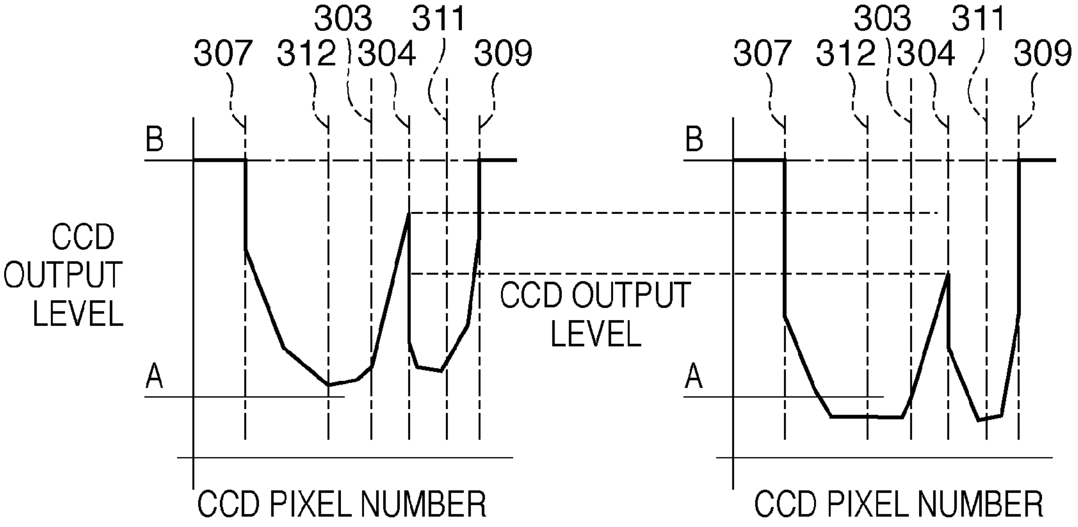

F I G. 13A
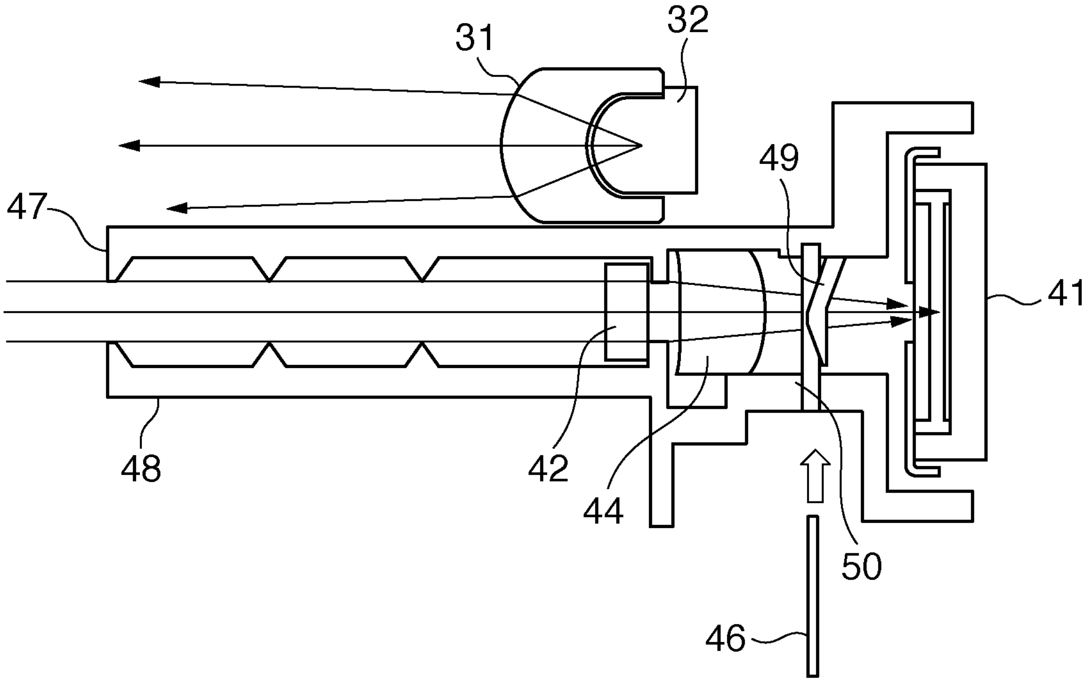
F I G. 13B
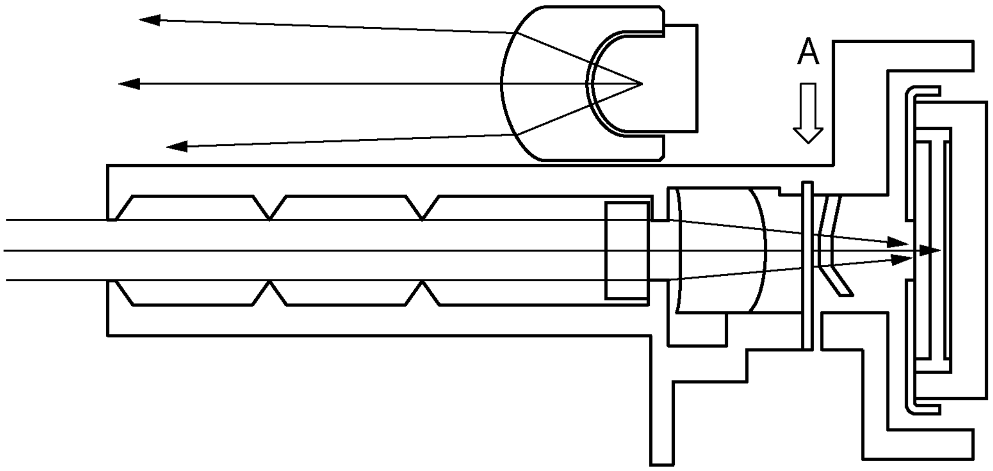

COORDINATE INPUT APPARATUS, LIGHT RECEIVING APPARATUS OF THE COORDINATE INPUT APPARATUS, AND MANUFACTURING METHOD OF THE SAME

BACKGROUND OF THE INVENTION

1. Field of the Invention

The present invention relates to a coordinate input apparatus. More specifically, the present invention relates to a coordinate input apparatus to be used to control a connected computer or write characters, figures, and the like by pointing positions on an input surface by using a pointing tool or finger. Furthermore, the present invention relates to a technique of improving the performance of calculating pointed positions, or a technical field for faithfully reproducing, as handwriting or the like, the intension of an operator having performed a pointing operation.

2. Description of the Related Art

There is a coordinate input apparatus to be used to control a connected computer or write characters, figures, and the like by inputting coordinates on a coordinate input surface by using a pointing tool (for example, a dedicated input pen or finger).

Conventionally, various types of coordinate input apparatuses of this kind have been proposed or manufactured as touch panels. These coordinate input apparatuses are extensively used because a terminal such as a personal computer can easily be operated on the screen without using any special equipment.

There are various coordinate input methods such as a method using a resistance film, a method using an ultrasonic wave or electromagnetic wave, and a method using light. An example is a coordinate input apparatus in which a light emitting portion is formed at the distal end of a pointing tool as a dedicated writing tool, a light source of the pointing tool emits light when a touch input operation is performed using the pointing tool, and a light receiving portion formed at each corner of a coordinate input effective region detects the light, thereby calculating the touch input position of the writing tool (Japanese Laid-Open No. 2005-78433).

There is another known method in which a retroreflecting sheet is formed outside a coordinate input region, light from an illumination unit for emitting light is retroreflected by the retroreflecting sheet, and a light receiving unit for receiving light detects the light amount distribution. A position in the coordinate input region is pointed by a light-shielding object such as a finger for shielding light, thereby detecting the direction (angle) in (at) which the light is shielded, and determining the light-shielding position, that is, the coordinates of the input position (U.S. Pat. No. 4,507,557).

In order to detect the direction (angle), there is a method of detecting the peak of a light-shielding portion where the light receiving unit receives light by performing waveform processing such as differentiation on a detection signal waveform, thereby detecting the angle the light-shielding portion makes with the light receiving unit (Japanese Patent Laid-Open No. 2001-105671). In addition, there is a method of detecting one end and the other end of a light-shielding portion by comparison with a specific level pattern, thereby detecting the center of their coordinates (Japanese Patent Laid-Open No. 2001-142642).

Also, there is a method that prestores received light distributions with and without light projection from the light projecting unit in the initial state, and calculates coordinates from the change amount and change ratio of the reflected light amount by using a received light distribution obtained during coordinate detection and the two prestored received light distributions (Japanese Patent Laid-Open No. 2004-185283).

Each of the disclosed patent documents described above relates to an optical method of detecting a pointed position by using light, and has a configuration including a light receiving optical system. The focus (focal point) of the light receiving optical system is adjusted at a predetermined distance, for example, at the shortest distance or farthest distance between an object and the light receiving optical system within the input range of a coordinate input apparatus (Japanese Patent Laid-Open No. 2001-84090).

Furthermore, a detectable light intensity range (dynamic range) is set in a light detecting element of the light receiving optical system. If this range is exceeded, no normal operation may be performed any longer because, for example, electric charge overflows. In the coordinate input apparatus of this kind, therefore, the detection light amount must be adjusted such that the light intensity falls within the dynamic range of the light receiving element regardless of the direction. On known example is a method of changing the light transmittance in accordance with the incident direction by using an optical filter, thereby adjusting the light intensity (Japanese Patent Laid-Open No. 2001-282445).

In the optical coordinate input apparatus of this kind, a distance range as a detection target of the light receiving optical system is wide, and it is necessary to determine a pointed position and determine whether a pointing tool has actually touched a coordinate input surface, even from an image sensing signal in an out-of-focus state. Even in an out-of-focus state, the pointed position can be calculated with a relatively high accuracy by, for example, obtaining the center of gravity of an image of the pointing tool. However, it is very difficult to determine, from an out-of-focus image sensing signal, whether the pointing tool has actually touched the coordinate input surface, and only rough determination is possible.

Assume that an operator inputs a character “あ” in this state. FIGS. 14A and 14B are views for explaining a phenomenon that occurs in this state. Referring to FIG. 14A, the solid lines indicate portions where the operator has touched the coordinate input surface with the pointing tool such as a finger, and the dotted lines indicate portions where the operator hasn't touched the coordinate input surface. FIG. 14B shows loci (handwriting) displayed on a display unit by this operation.

A case in which it is determined by mistake that the operator has touched the positions of points b, c, and d in FIG. 14A although he or she hasn't will be explained below. In this case, as shown in FIG. 14B, “a short upward sweep” as an originally unintended locus is generated between points b and c. Also, if it is determined by mistake that the operator hasn't touched the position of point e although he or she actually has, an originally intended locus disappears near the position of point e as shown in FIG. 14B. This touch determination error causes an operation not intended by the operator, and hence significantly deteriorates the operability.

On the other hand, the operability remarkably improves if it is possible to form an optical system having a large depth of field and capable of focusing within the entire range. Unfortunately, this optical system includes lenses and optical elements having complicated shapes, or additionally includes an auto-focusing mechanism, and is difficult to inexpensively manufacture.

Furthermore, the coordinate input apparatuses have various sizes due to different product specifications or a series of sizes as a product lineup. In other words, a distance range to be detected changes in accordance with the specifications of each product, and this makes it difficult to use common parts in light receiving optical systems, and makes inexpensive manufacture impossible.

Moreover, the settings of jigs and tools for adjusting the optical axis and focus point of an optical system must be changed in accordance with the size of a coordinate input apparatus, and this unavoidably increases the number of assembly steps. Also, when the size of the coordinate input apparatus increases, the sizes of the jigs and tools increase accordingly, and this poses the problem of an installation space. In addition, the adjustment of the jigs and tools requires a considerable precision, and as a consequence the productivity decreases.

SUMMARY OF THE INVENTION

The present invention provides a coordinate input apparatus capable of inexpensively increasing the accuracy of position detection and the accuracy of touch determination, a light receiving apparatus for use in the coordinate input apparatus, and a manufacturing method of manufacturing a highly reliable coordinate input apparatus.

According to the first aspect the present invention, a coordinate input apparatus comprises: a reflection unit formed in a peripheral portion of a coordinate input effective region, and adapted to retroreflect incident light; a light projection unit adapted to project light toward the coordinate input effective region; and a light receiving unit formed at a corner of the coordinate input effective region, coordinate values of a pointed position being calculated based on a light amount distribution obtained by the light receiving unit, wherein the light receiving unit comprises at least: a light receiving element; a light receiving lens; an adjusting unit adapted to adjust a positional relationship between the light receiving element and the light receiving lens; and a light transmissive plate arranged between the light receiving element and the light receiving lens, and adapted to define a focal length of the light receiving lens, and the light transmissive plate is arranged between the light receiving element and the light receiving lens in a state in which an optical axis between the light receiving element and the light receiving lens is adjusted by the adjusting unit with the light transmissive plate being removed.

According to the second aspect the present invention, a light receiving apparatus of an optical coordinate input apparatus, comprises: a light receiving element; a light receiving lens; an adjusting unit adapted to adjust a positional relationship between the light receiving element and the light receiving lens; and a light transmissive plate arranged between the light receiving element and the light receiving lens, and adapted to define a focal length of the light receiving lens, wherein the light transmissive plate is arranged between the light receiving element and the light receiving lens in a state in which an optical axis between the light receiving element and the light receiving lens is adjusted by the adjusting unit with the light transmissive plate being removed.

According to the third aspect of the present invention, a method of manufacturing a light receiving apparatus of an optical coordinate input apparatus, comprises: an adjustment step of adjusting an optical axis between a light receiving element and light receiving lens of the light receiving apparatus, as adjustment of a positional relationship between the light receiving element and the light receiving lens, such that a focus is adjusted to a distance shorter than a farthest point distance of a coordinate input effective region of the coordinate input apparatus from the light receiving apparatus within a viewing range of the light receiving apparatus; and an attaching step of attaching, between the light receiving element and the light receiving lens, a light transmissive plate having a thickness with which a focus of the light receiving apparatus is adjusted to the farthest point distance within the viewing range of the light receiving apparatus, after the adjustment step.

The present invention can provide a coordinate input apparatus capable of inexpensively increasing the accuracy of position detection and the accuracy of touch determination, a light receiving apparatus for use in the coordinate input apparatus, and a manufacturing method of manufacturing a highly reliable coordinate input apparatus.

Further features of the present invention will become apparent from the following description of exemplary embodiments (with reference to the attached drawings).

BRIEF DESCRIPTION OF THE DRAWINGS

FIG. 12A is a view for explaining the transmittance characteristic of a light transmissive plate of the third embodiment;

FIG. 12B is a view for explaining the transmittance characteristic of the light transmissive plate of the third embodiment;

FIG. 12C is a view for explaining the transmittance characteristic of the light transmissive plate of the third embodiment;

FIGS. 13A and 13B are views for explaining an attachment member of the fourth embodiment;

DESCRIPTION OF THE EMBODIMENTS

Figure 1:
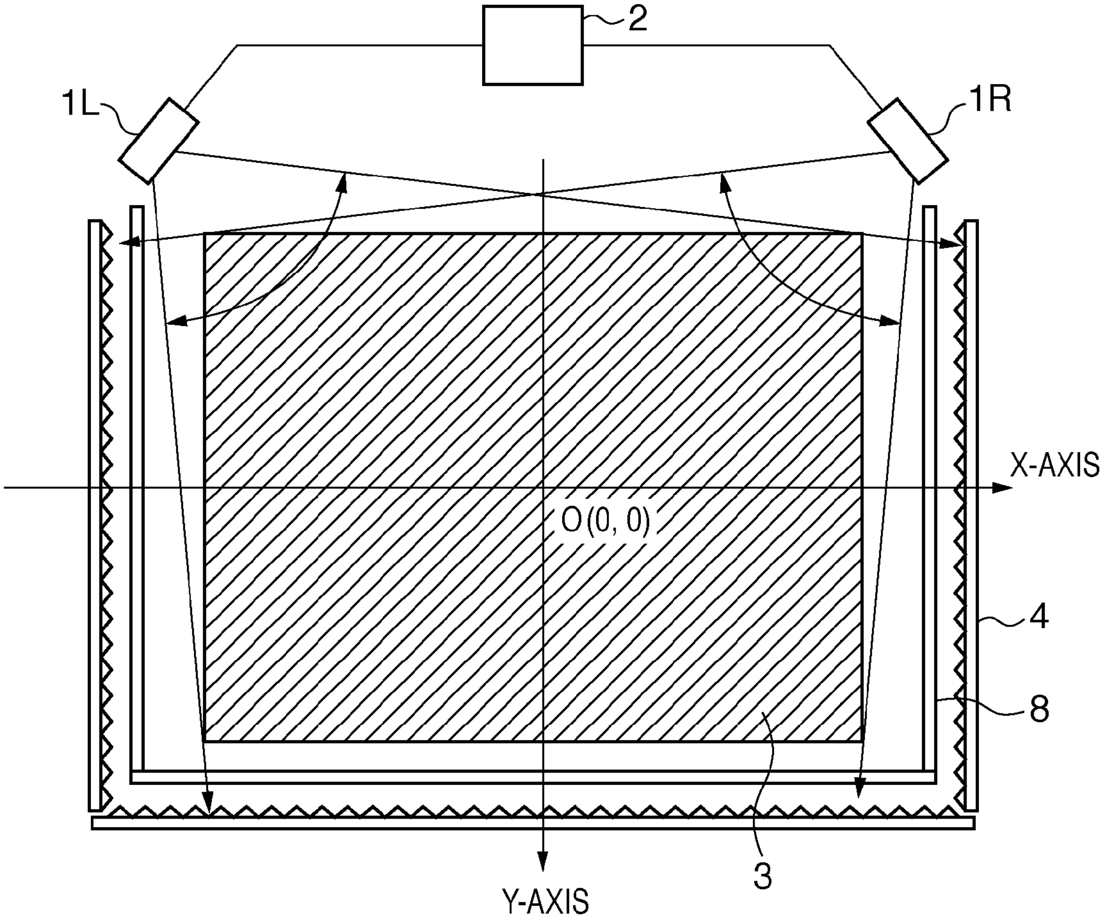
FIG. 1 is a view showing an outline of the arrangement of an optical coordinate input apparatus of the first embodiment.

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Note that configurations disclosed in the following embodiments are merely examples, and the present invention is not limited to those configurations shown in the drawings.

First Embodiment

First, an outline of the arrangement of a coordinate input apparatus according to the present invention will be explained below with reference to FIG. 1.

FIG. 1 is a view showing an outline of the arrangement of an optical coordinate input apparatus of the first embodiment.

In FIG. 1, reference numerals 1L and 1R denote sensor units each including a light projecting unit and light receiving unit (light receiving apparatus). In the first embodiment as shown in FIG. 1, the sensor units 1L and 1R are arranged at a predetermined distance at positions (corners) parallel to the X-axis of a coordinate input effective region 3 as a coordinate input surface and symmetrical with respect to the Y-axis. The sensor units 1L and 1R are connected to a control/arithmetic unit 2, receive control signals from the control/arithmetic unit 2, and transmit detected signals to the control/arithmetic unit 2.

Reference numeral 4 denotes a retroreflecting member having a retroreflecting surface for retroreflecting incident light in the incident direction, and arranged in the periphery (on the three sides of) the coordinate input effective region 3. The retroreflecting member 4 retroreflects, toward the left and right sensor units 1L and 1R, light projected within the range of almost 90° from the sensor units 1L and 1R.

Note that the retroreflecting member 4 microscopically has a three-dimensional structure. At present, a bead type retroreflecting tape or a retroreflecting tape that causes a retroreflecting phenomenon by regularly arranging corner cubes by mechanical processing or the like is mainly known as the retroreflecting member 4.

Reference numeral 8 denotes a light transmitting member capable of transmitting only light having a specific wavelength. The light transmitting member 8 prevents the transmission of unnecessary light, and also prevents the retroreflecting member 4 from being directly exposed to the outside, thereby forming a part of the outer appearance of the product. When the coordinate input apparatus is used as a product, therefore, the user can easily remove "dust", "trash", and the like deposited on the light transmitting member 8 by, for example, "wiping" the light transmitting member 8. This facilitates semi-permanently maintaining the optical characteristics of the retroreflecting member 4, and makes it possible to implement a highly reliable apparatus.

The sensor units 1L and 1R one-dimensionally detect the light retroreflected by the retroreflecting member 4, and transmit the light amount distribution to the control/arithmetic unit 2.

The coordinate input effective region 3 is usable as an interactive input device when formed as the display screen of a display device (connected to an external terminal as the coordinate output destination) such as a PDP, rear projector, or LCD panel.

When input pointing is performed in the coordinate input effective region 3 by a finger or pointing tool in the arrangement as described above, the light projected from each of the light projecting units of the sensor units 1L and 1R is shielded (a light-shielding portion). Consequently, the light receiving units of the sensor units 1L and 1R cannot detect light (retroreflected light) from this light-shielding portion. This makes it possible to determine a direction in which no light can be detected.

Accordingly, based on changes in light amounts detected by the left and right sensor units 1L and 1R, the control/arithmetic unit 2 detects the light-shielding range of the portion pointed by the pointing tool. Based on information of this light-shielding range, the control/arithmetic unit 2 calculates the direction of the light-shielding position (the angle of the pointing tool) for each of the sensor units 1L and 1R.

Then, based on the calculated directions (angles), information of the distance between the sensor units 1L and 1R, and the like, the control/arithmetic unit 2 geometrically calculates the light-shielding position (pointed position) of the pointing tool on the coordinate input effective region 3. The control/arithmetic unit 2 outputs a coordinate value corresponding to the calculated light-shielding position to an external terminal such as a host computer connected to the display device, via an interface (for example, a USB or IEEE1394).

Thus, the user can operate the external terminal, for example, can draw lines on the screen and operate icons displayed on the display device by using the pointing tool.

<Detailed Explanation of Sensor Unit 1>

First, the arrangement of the light projecting unit of each of the sensor units 1L and 1R will be explained below with reference to FIGS. 2A and 2B.

Figure 2A:
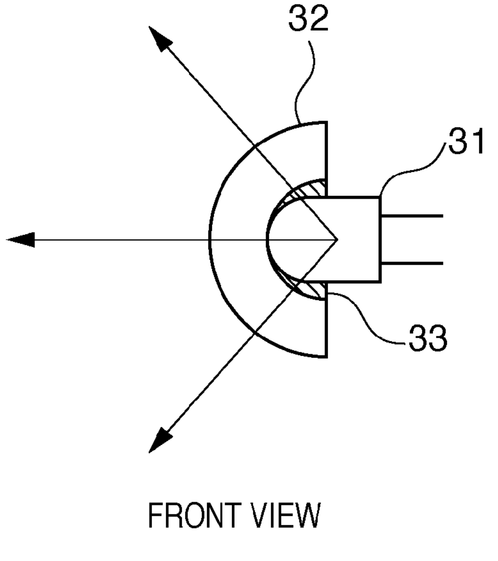
FIG. 2A is a view showing a configuration example of a light projecting unit of a sensor unit of the first embodiment.
Figure 2B:
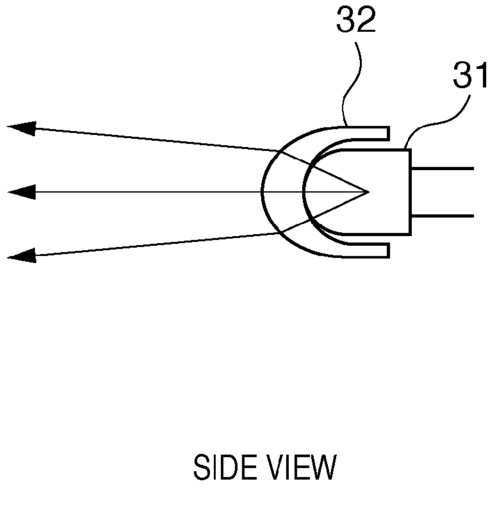
FIG. 2B is a view showing the configuration example of the light projecting unit of the sensor unit of the first embodiment.

FIGS. 2A and 2B are views showing a configuration example of the light projecting unit of the sensor unit of the first embodiment.

FIG. 2A is a view in which a light projecting unit 30 is viewed frontways (in a direction perpendicular to the coordinate input surface of the coordinate input effective region 3). Reference numeral 31 denotes an infrared LED for emitting infrared light for coordinate detection. The light emitted from the infrared LED 31 is projected within the range of almost 90° by a light projecting lens 32. Reference numeral 33 denotes an adhesive layer formed such that the light from the infrared LED 31 can efficiently be projected from the lens surface of the light projecting lens 32.

On the other hand, FIG. 2B is a side view in which the light projecting unit 30 is viewed sideways (in a direction parallel to the coordinate input surface of the coordinate input effective region 3). In this direction, the light from the infrared LED 31 is projected as a bundle of rays restricted in the vertical direction. Accordingly, the light can mainly be projected onto the retroreflecting member 4.

Next, the arrangement of the light receiving unit of each of the sensor units 1L and 1R will be explained with reference to FIGS. 3A and 3B.

Figure 3B:
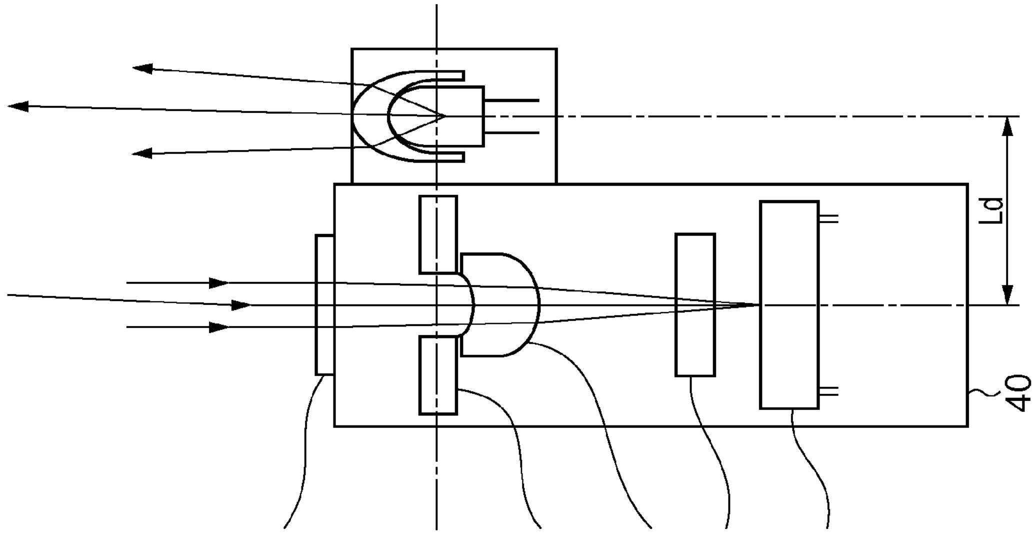
FIG. 3B is a view showing the configuration example of the sensor unit of the first embodiment.
Figure 3A:
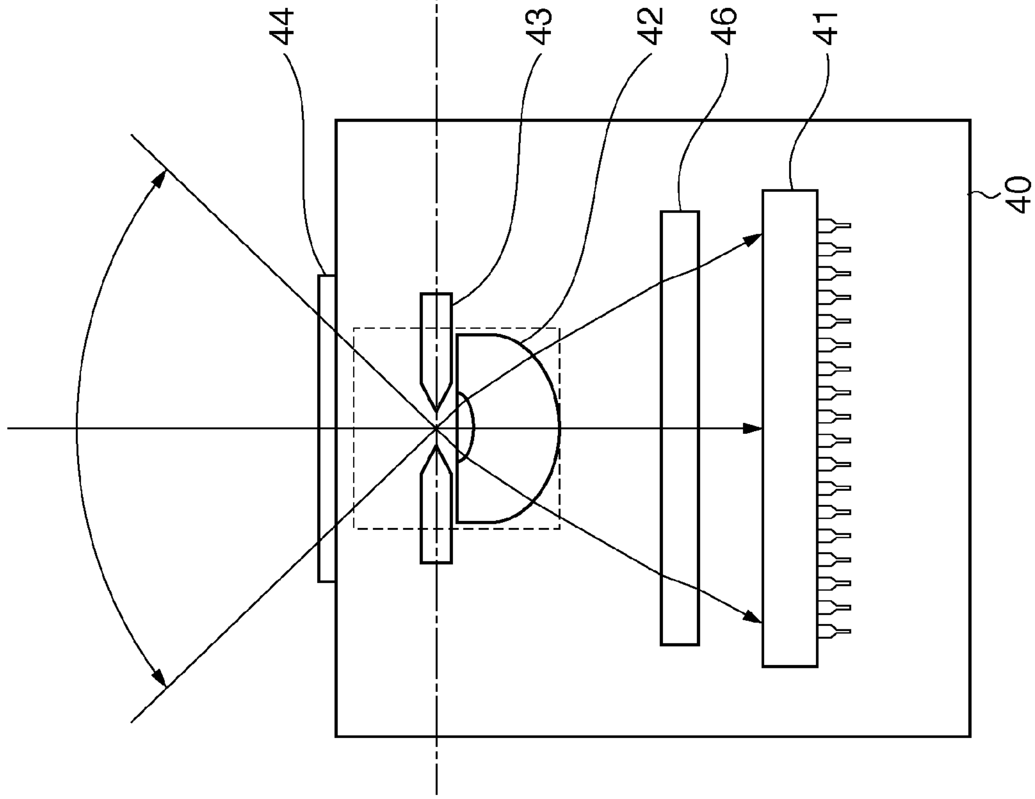
FIG. 3A is a view showing a configuration example of the sensor unit of the first embodiment.

FIGS. 3A and 3B are views showing a configuration example of the sensor unit of the first embodiment.

FIG. 3A is a view in which a light receiving unit 40 is viewed frontways (in the direction perpendicular to the coordinate input surface of the coordinate input effective region 3). FIG. 3B is a side view of the light receiving unit 40. Note that the broken lines in FIG. 3A indicate the layout of the light projecting unit 30 in the sensor unit 1 shown in FIG. 3B. In the first embodiment, the light projecting unit 30 and light receiving unit 40 overlap each other, and a distance Ld between them is much shorter than the distance from the light projecting unit 30 to the retroreflecting member 4. Accordingly, the light receiving unit 40 can detect the retroreflected light from the retroreflecting member 4 even at the distance Ld.

Referring to FIG. 3B, the light receiving unit 40 includes a light receiving element 41, a light receiving lens 42 as a condenser optical system, an aperture 43 for limiting the incident direction of the incident light, and an infrared filter 44 for preventing the incidence of extra light such as visible light. In addition, the light receiving unit 40 includes an optical axis adjusting unit (not shown) for adjusting the positional relationship between these optical parts, a light transmissive plate 46 for setting the focusing position of the light receiving unit 40, and an attachment member 49 (not shown in FIGS. 3A and 3B) for holding the light transmissive plate 46.

The light transmissive plate 46 functions as a member for defining the focal length of the light receiving lens 42 of the light receiving unit 40. More specifically, the focal length of the light receiving lens 42 of the light receiving unit 40 is defined by setting the light transmittance of the light transmissive plate 46.

Note that a one-dimensional line CCD is used as the light receiving element 41 in the first embodiment. Referring to FIG. 3A, light projected in the direction of almost 90° from the light projecting unit 30 is retroreflected by the retroreflecting member 4 and propagates through the infrared filter 44 and aperture 43, and the light receiving lens 42 forms an image of the light on pixels of the line CCD in accordance with the incident angle of the light. As an output signal from the line CCD, therefore, a light amount distribution corresponding to the incident angle of the reflected light is output. Accordingly, the pixel number of each pixel forming the line CCD indicates angle information.

Note that details of the optical axis adjusting unit, light transmissive plate 46, and attachment member 49 will be described later.

<Explanation of Control/Arithmetic Unit 2>

The control/arithmetic unit 2 and sensor units 1L and 1R mainly exchange a CCD control signal and CCD clock signal for the light receiving element (line CCD) 41 in the light receiving unit 40, a CCD output signal, and a driving signal for the infrared LED 31 of the light projecting unit 30.

The arrangement of the control/arithmetic unit 2 will be explained in detail below with reference to FIG. 4A.

Figure 4A:
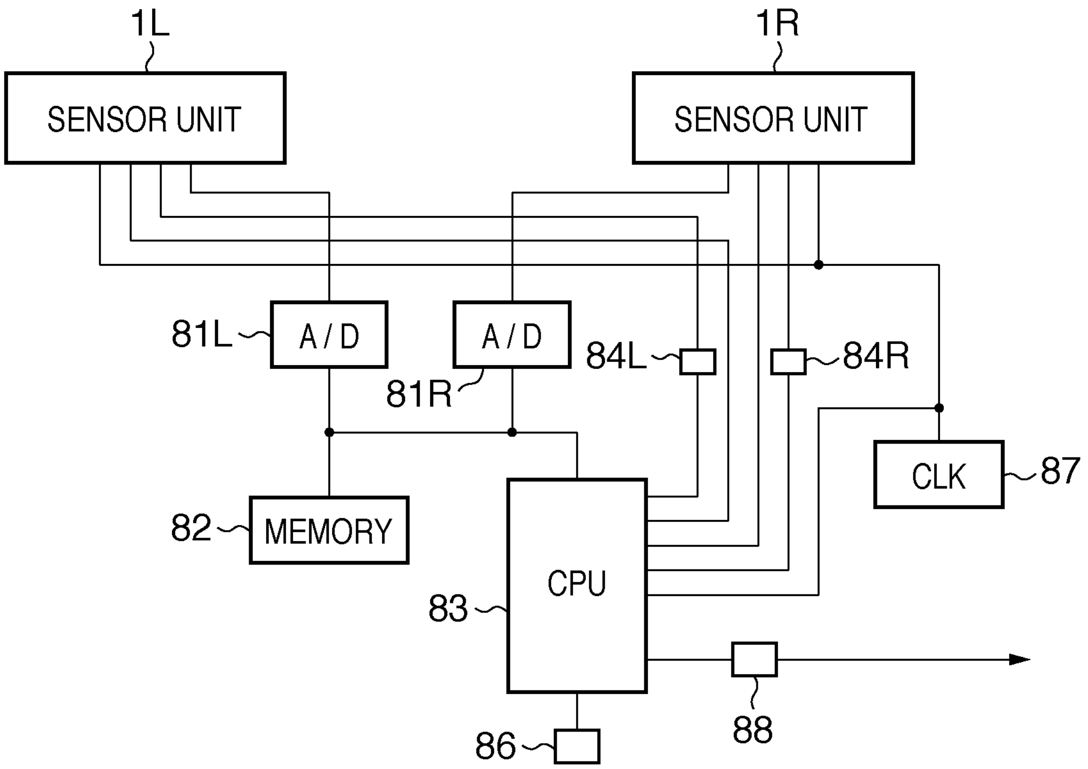
FIG. 4A is a block diagram showing the arrangement and operation of a control/arithmetic unit of the first embodiment.

FIG. 4A is a block diagram showing details of the arrangement of the control/arithmetic unit 2 of the first embodiment.

An arithmetic control circuit (CPU) 83 formed by a one-chip microcomputer or the like outputs a CCD control signal, thereby controlling the shutter timing, data output, and the like of the line CCD.

Note that the arithmetic control circuit 83 operates in accordance with a clock signal from a main clock generation circuit 86. Note also that a CCD clock signal is transmitted from a clock generation circuit (CLK) 87 to the sensor units 1L and 1R, and also input to the arithmetic control circuit 83 in order to perform various control operations in synchronism with the internal line CCD of each sensor unit.

LED driving signals for driving the infrared LEDs 31 of the light projecting units 30 are supplied from the arithmetic control circuit 83 to the infrared LEDs 31 of the light projecting units 30 of the sensor units 1L and 1R via LED driving circuits 84L and 84R.

Detection signals from the line CCDs as the light receiving elements 41 of the light receiving units 40 of the sensor units 1L and 1R are input to A/D converters 81L and 81R of the control/arithmetic unit 2, and converted into digital values under the control of the arithmetic control circuit 83. The converted digital values are stored in a memory 82, and used in the calculation of the angle of the pointing tool. A coordinate value is calculated from this calculated angle, and output to the external terminal via a serial interface 88 (for example, a USB or RS232C interface).

Explanation of Light Amount Distribution Detection>

Figure 4B:
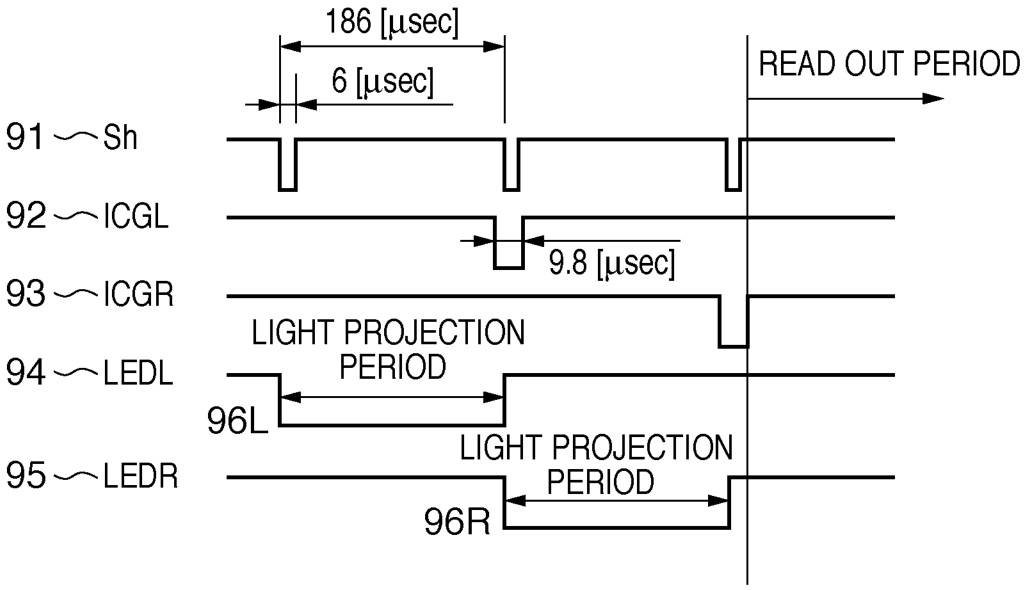
FIG. 4B is a block diagram showing the arrangement and operation of the control/arithmetic unit of the first embodiment.

FIG. 4B is a timing chart of the control signals of the first embodiment.

In FIG. 4B, reference numerals 91 to 93 denote CCD control signals. The interval of an SH signal 91 determines the shutter release time of the line CCD. An ICGL signal 92 and ICGR signal 93 are respectively gate signals to the sensor units 1L and 1R, and each used to transfer electric charge in a photoelectric converter of the internal line CCD to a reading unit.

Reference numerals 94 and 95 denote driving signals of the light projecting units 30 of the sensor units 1L and 1R. To turn on the light projecting unit 30 of the sensor unit 1L (a light projection period 96L) in the first cycle of the SH signal 91, the LEDL signal 94 is supplied to the light projecting unit 30 of the LED driving circuit 84L. Also, to turn on the light projecting unit 30 of the sensor unit 1R (a light projection period 96R) in the next cycle of the SH signal 91, the LEDR signal 95 is supplied to the light projecting unit 30 via the LED driving circuit 84R.

When the driving of the light projecting units 30 of both the sensor units 1L and 1R is complete, detection signals are read out from the light receiving units 40 (line CCDs) of both the sensor units 1L and 1R.

Figure 5A:
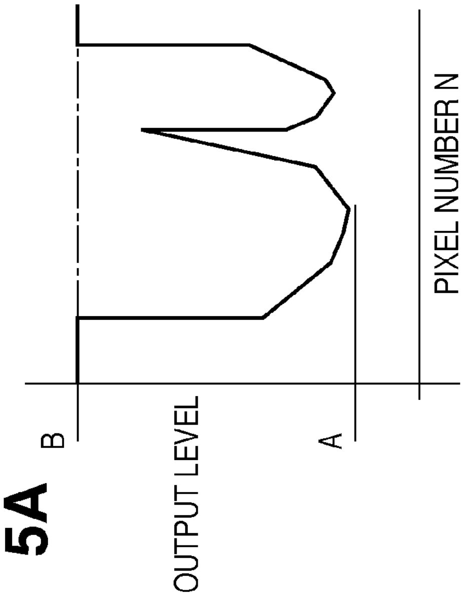
FIG. 5A is a view showing the light amount distribution of the sensor unit of the first embodiment.

When nothing is input in the coordinate input effective region 3 by the pointing tool, a light amount distribution as shown in FIG. 5A is obtained from the detection signals read out from both the sensor units 1L and 1R, as the output from these sensor units. This light amount distribution changes in accordance with the retroreflection characteristics of the retroreflecting member 4, the optical characteristics of the light projecting units 30 and light receiving units 40, the size and shape (aspect ratio) of the input surface of the coordinate input apparatus, and deterioration with time (for example, contamination of the reflecting surface).

Referring to FIG. 5A, level A is a maximum light amount, and level B is a minimum light amount.

That is, the light amount level obtained by the sensor units 1L and 1R is close to level B when there is no reflected light from the retroreflecting member 4, and changes to level A as the reflected light amount increases. The light receiving element 41 can convert light into electric charge in accordance with the light intensity, but the range of the light intensity is limited to a specific range. Assuming that this specific range is the dynamic range of the light receiving element 41, the output from the light receiving element 41 contains an error if the light receiving element 41 receives intense light outside this range. Accordingly, the detection signal (FIG. 5A) output from the light receiving unit 40 must fall within the dynamic range. The detection signals thus output from the sensor units 1L and 1R are A/D-converted by the A/D converters 81L and 81R and supplied as digital data to the arithmetic control circuit 83.

Figure 5B:
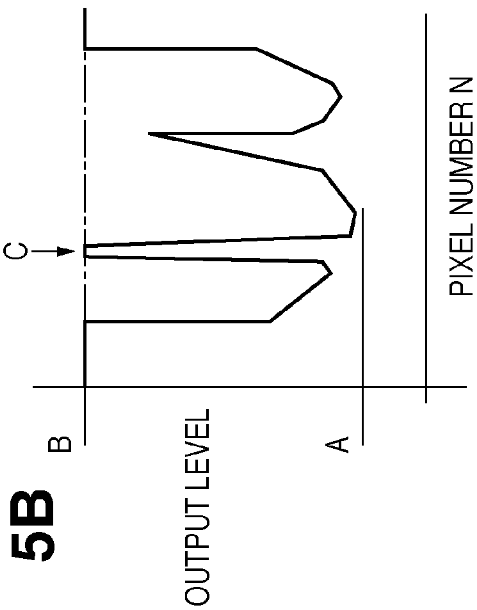
FIG. 5B is a view showing the light amount distribution of the sensor unit of the first embodiment.

By contrast, when a position is input in the coordinate input effective region 3 by the pointing tool, a light amount distribution as shown in FIG. 5B is obtained as the output from the sensor units 1L and 1R.

In portion C of this light amount distribution, the pointing tool shields the reflected light from the retroreflecting member 4. Therefore, the reflected light amount decreases in only this portion (light-shielding range).

In the first embodiment, the angles the pointing tool makes with the sensor units 1L and 1R are calculated based on the difference between the light amount distribution shown in FIG. 5A when no position is input by the pointing tool and the light amount distribution shown in FIG. 5B when a position is input by the pointing tool.

More specifically, the light amount distribution shown in FIG. 5A is prestored as an initial state (data obtained in this initial state will be referred as initial data) in the memory 82. Then, whether the light amount distribution shown in FIG. 5A has changed during the sampling period of the detection signals from the sensor units 1L and 1R is detected, based on the difference between the light amount distribution during the sampling period and the light amount distribution in the initial state. If the light amount distribution has changed, an arithmetic operation of determining the input angle of the pointing tool is performed by using this changed portion as the input point of the pointing tool.

<Explanation of Angle Calculation>

When calculating the angles the pointing tool makes with the sensor units 1L and 1R, it is necessary to first detect the light-shielding range of the pointing tool.

As described above, the light amount distribution detected by the sensor units 1L and 1R changes due to, for example, deterioration with time or the change with time of the surrounding environment in the installation environment. Therefore, the light amount distribution in the initial state is, for example, stored in the memory 82 whenever the system is activated.

The calculation of the angle the pointing tool makes with one (for example, the sensor unit 1L) of the sensor units 1L and 1R will be explained below, but the same angle calculation is, of course, performed for the other (the sensor unit 1R).

When the power supply is turned on, in a state in which there is no input (no light-shielding portion) and the light projecting unit 30 in the sensor unit 1L stops projecting light, the light amount distribution as the output from the light receiving unit 40 is A/D-converted, and the obtained value is stored as Bas_data[N] in the memory 82.

Note that this value is data containing, for example, the variation in bias of the light receiving unit 40 (the light receiving element 41 (line CCD)), and is data close to level B shown in FIG. 5A. N is the pixel number of a pixel forming the line CCD, and a pixel number corresponding to an effective input range (effective range) is used as N.

Then, while the light projecting unit 30 is projecting light, the light amount distribution as the output from the light receiving unit 40 is A/D-converted, and the obtained value is stored as Ref_data[N] in the memory 82. Note that this value is data indicated by the solid line in FIG. 5A.

Bas_data[N] and Ref_data[N] stored in the memory 82 are used to first determine the presence/absence of input by the pointing tool and the presence/absence of a light-shielding range.

Assume that pixel data of the Nth pixel in the sampling period of the output from the sensor unit 1L (the light receiving element 41 (line CCD)) is Norm_data[N].

First, to specify a light-shielding range, the presence/absence of a light-shielding range is determined by the absolute value of the change in pixel data. The purpose of this determination is to prevent a determination error due to noise or the like, and detect a reliable change in predetermined amount.

More specifically, the absolute value of the change in pixel data is compared with a predetermined threshold value Vtha by performing the following calculation for each pixel of the line CCD.

$$\text{Norm\_data\_}a[N]=\text{Norm\_data}[N]-\text{Ref\_data}[N] \quad (1)$$

where Norm_data_a[N] is the absolute change amount at each pixel of the line CCD.

In this processing, the absolute change amount Norm_data_a[N] of each pixel of the line CCD is simply calculated and compared with the threshold value Vtha. Therefore, the processing does not require a long processing time, and can rapidly determine the presence/absence of input. It is determined that there is input by the pointing tool especially when the number of detected pixels exceeding the threshold value Vtha for the first time has exceeded a predetermined number.

Then, to more accurately detect input by the pointing tool, the input point is determined by calculating the ratio of the change in pixel data.

Assuming that a light amount shielded by the pointing tool is obtained by calculating the ratio of the change in pixel data, the ratio can be calculated by $$\text{Norm\_data\_r}[N]=\text{Norm\_data\_a}[N]/(\text{Bas\_data}[N]-\text{Ref\_data}[N]) \quad (2)$$

By applying a threshold value Vthr to this pixel data, pixel numbers corresponding to the leading edge and trailing edge of the pixel data distribution corresponding to the light-shielding range is acquired. By regarding the median of the two pixel numbers as a pixel corresponding to input by the pointing tool, a more accurate input position of the pointing tool can be determined.

In addition, to perform detection at resolution higher than the pixel interval of the line CCD, an arithmetic operation is performed using the data level of a pixel of the line CCD and the data level of an immediately preceding adjacent pixel.

Figure 6A:
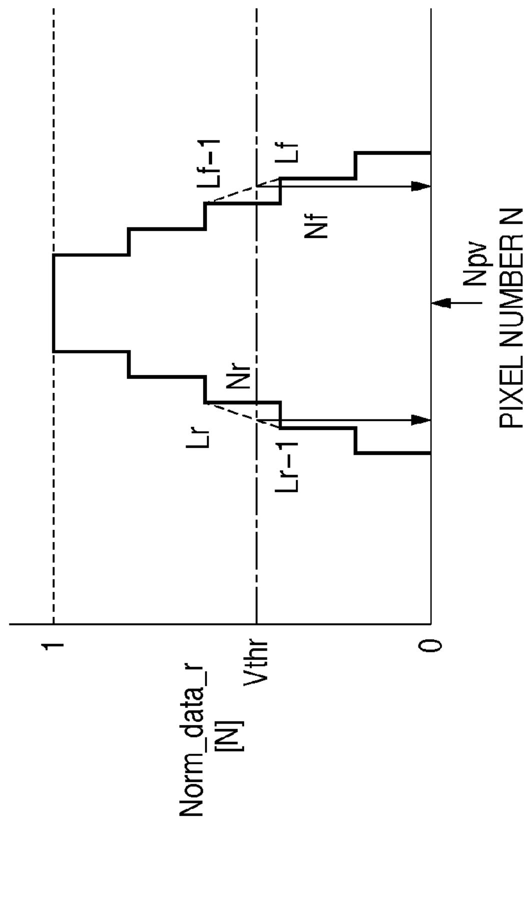
FIG. 6A is a view for explaining the conversion from pixel information into angle information in the first embodiment.

More specifically, in FIG. 6A, let Lr be the data level of the (Nr)th pixel, and Lr−1 be the data level of the (Nr−1)th pixel. Also, let Lf be the data level of the (Nf)th pixel, and Lf−1 be the data level of the (Nf−1)th pixel. Then, pixel numbers Nrv and Nfv to be detected can be calculated by $$Nrv=Nr-1+(Vthr-Lr-1)/(Lr-Lr-1) \quad (3)$$

$$Nfv=Nf-1+(Vthr-Lf-1)/(Lf-Lf-1) \quad (4)$$

This makes it possible to acquire a virtual pixel number corresponding to the output data level, that is, acquire a virtual pixel number finer than the pixel number of the line CCD, and a virtual central pixel Npv to be output is determined by $$Npv=Nrv+(Nfv-Nrv)/2 \quad (5)$$

As described above, detection having a higher resolution can be implemented by calculating a virtual pixel number crossing the threshold value Vthr from the pixel number of a pixel having a data level exceeding the threshold value Vthr, the pixel number of an adjacent pixel, and the data levels of these pixels.

<Conversion from Pixel Information (Pixel Number) into Angle Information>

To calculate the actual coordinate value of the pointing tool from the middle pixel number indicating the central point of the light-shielding range, this central pixel number must be converted into angle information (θ).

Figure 6B:
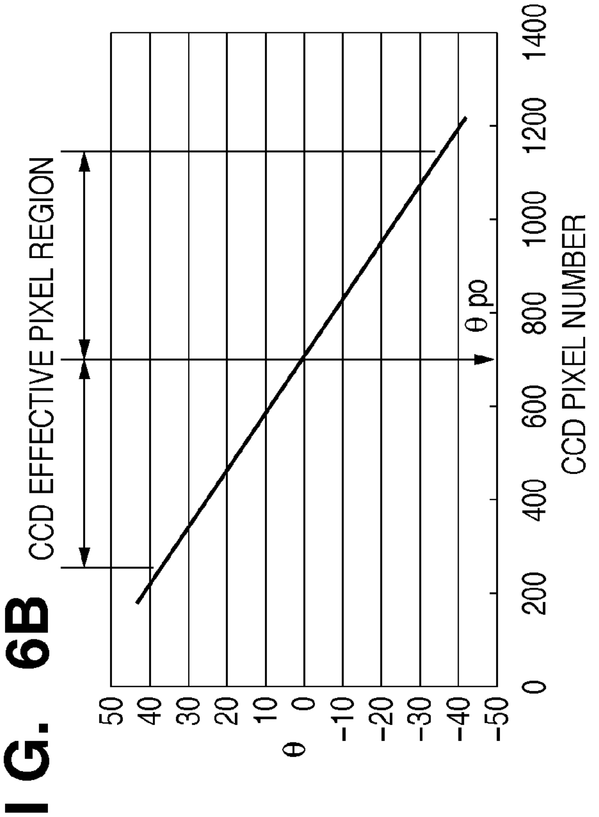
FIG. 6B is a view for explaining the conversion from pixel information into angle information in the first embodiment.

FIG. 6B indicates the relationship between the pixel number and an angle θ. Based on FIG. 6B, an approximate expression for obtaining θ from the pixel number is defined by $$\theta=f(N) \tag{6}$$

The pixel number can be converted into θ by using this approximate expression (conversion expression).

In the first embodiment, lens groups are formed in the light receiving unit 40 of the sensor unit 1L (1R) explained earlier, so that approximation is possible by using a linear approximate expression. However, it is sometimes possible to obtain the angle information with higher accuracy by using a higher-order approximate expression due to, for example, the optical aberration of a lens.

The type of lens group to be adopted is closely related to the manufacturing cost. In particular, a considerable operation capability (operation speed) is required when correcting an optical distortion, which generally occurs when the manufacturing cost of a lens group is decreased, by using a higher-order approximate expression. Accordingly, while taking account of a coordinate calculation accuracy required for a target product, it is only necessary to appropriately set the operation capability and coordinate calculation accuracy.

<Explanation of Coordinate Calculation Method>

A coordinate calculation method of calculating the position coordinates of the pointing tool from the angle data (tan θ) converted from the pixel number will be explained below.

The positional relationship between coordinates defined on the coordinate input effective region 3 and the sensor units 1L and 1R will be explained with reference to FIG. 7.

Figure 7:
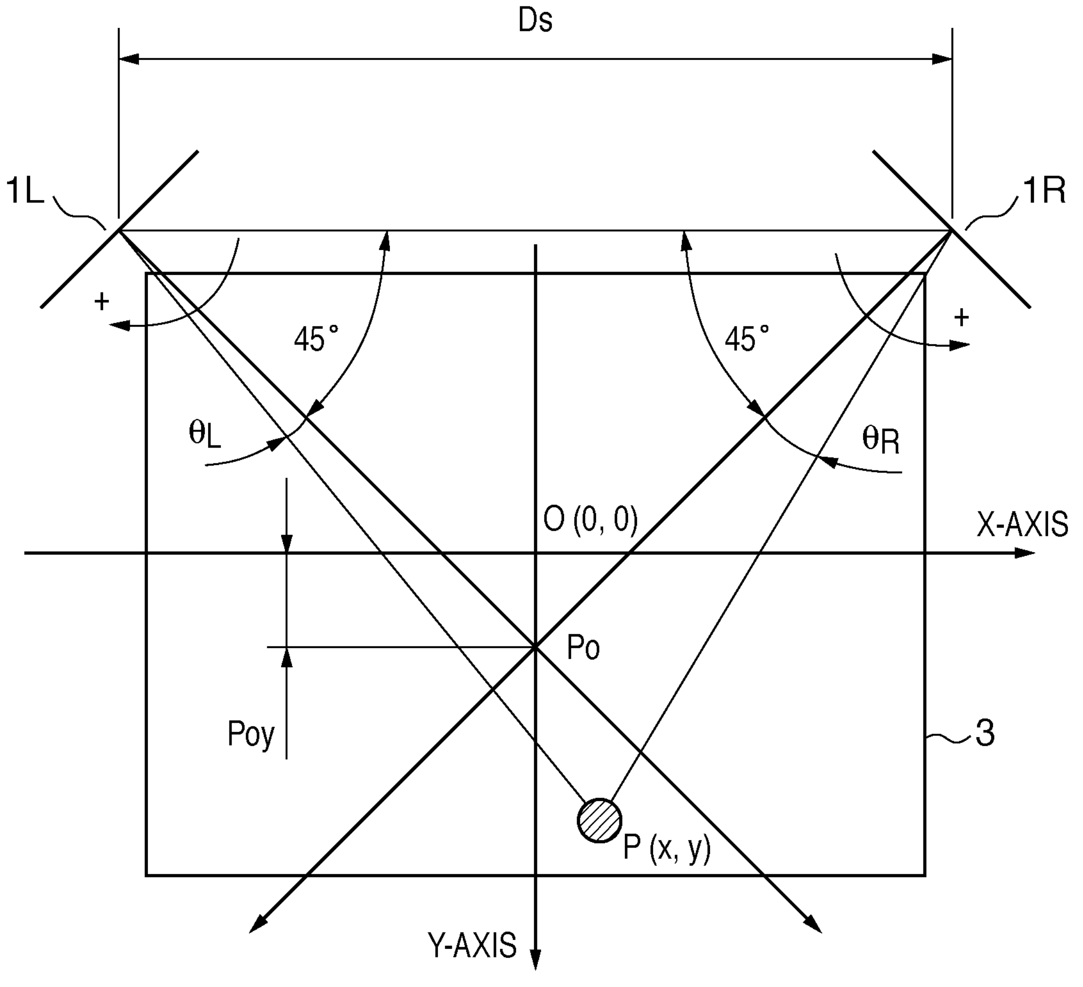
FIG. 7 is a view showing the positional relationship between coordinates defined on a coordinate input effective region and the sensor units in the first embodiment.

FIG. 7 is a view showing the positional relationship between coordinates defined on the coordinate input effective region and the sensor units 1L and 1R in the first embodiment.

Referring to FIG. 7, the X-axis is defined as the horizontal direction of the coordinate input effective region 3, the Y-axis is defined as the vertical direction, and the center of the coordinate input effective region 3 is defined as an origin O (0,0). The sensor units 1L and 1R are attached to the left and right ends of the upper side of the coordinate input range of the coordinate input effective region 3 so as to be symmetrical with respect to the Y-axis, and the distance between the sensor units 1L and 1R is Ds. The light receiving surfaces of the sensor units 1L and 1R are arranged such that the normal direction to each light receiving surface makes an angle of 45° with the X-axis, and the normal direction (reference direction) is defined as 0°.

In this state, the sign of the angle is defined such that the clockwise rotation is the "+" direction for the sensor unit 1L arranged on the left side, and the counterclockwise rotation is the "+" direction for the sensor unit 1R arranged on the right side. Also, P0 in FIG. 7 is the intersection of the normals to the sensor units 1L and 1R. Furthermore, the distance from the origin in the Y-axis direction is defined as P0*y*. In this state, letting θL and θR be angles respectively obtained by the sensor units 1L and 1R, coordinates P(x,y) of a point P to be detected are calculated by $$x=Ds/2*(\tan\theta R-\tan\theta L)/(1-(\tan\theta R*\tan\theta L)) \tag{7}$$

$$y=Ds/2*(\tan\theta R+\tan\theta L+(2*\tan\theta R*\tan\theta L))/(1-(\tan\theta R*\tan\theta L))+P0y \tag{8}$$

<Explanation of Angle Calculation Process>

Figure 8:
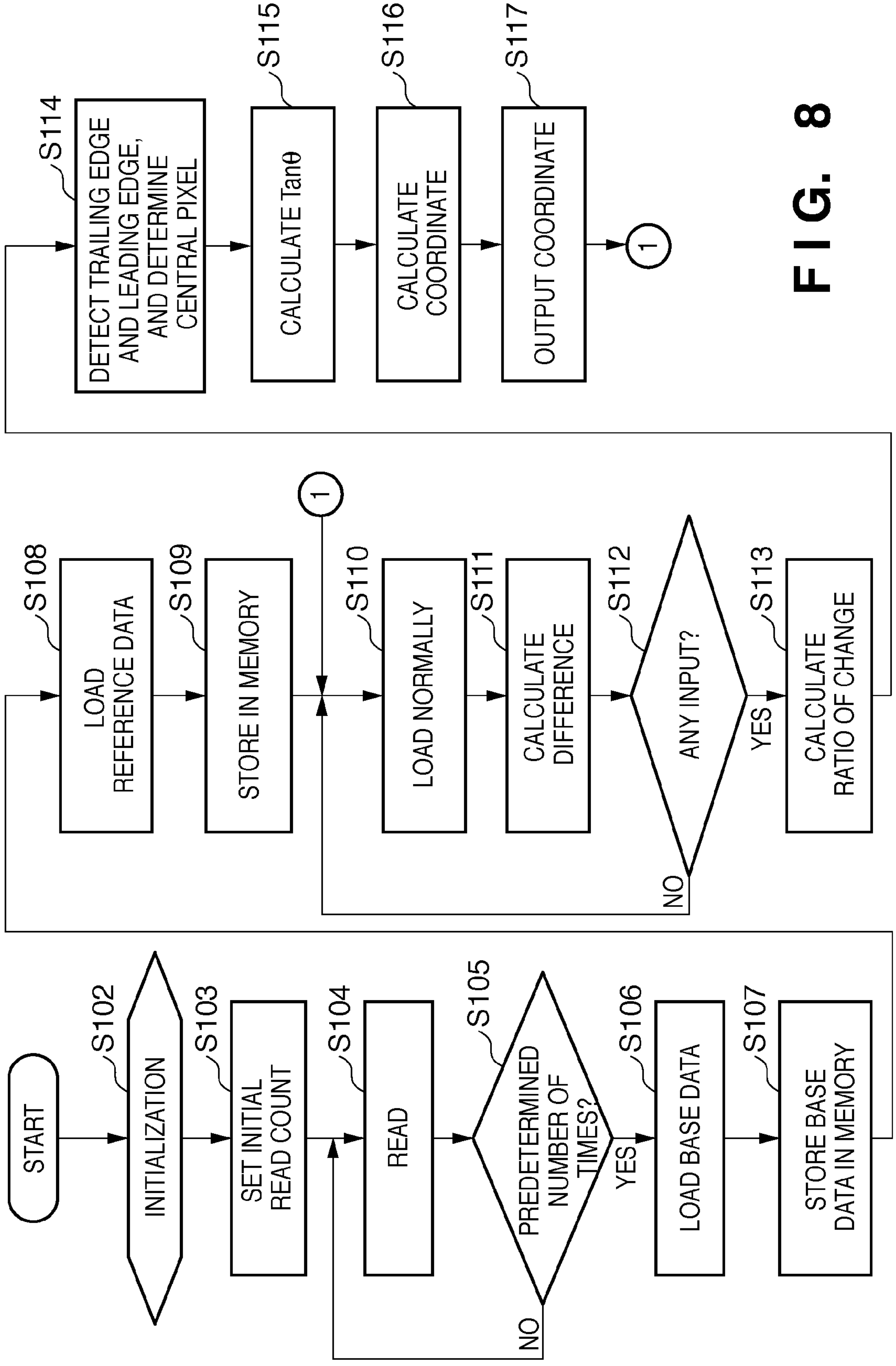
FIG. 8 is a flowchart showing a coordinate calculation process of the first embodiment.

FIG. 8 is a flowchart showing the coordinate calculation process executed by the coordinate input apparatus of the first embodiment.

First, when the power supply of the coordinate input apparatus is turned on, various initialization processes pertaining to the coordinate input apparatus, for example, port settings and timer settings of the control/arithmetic unit 2 are performed in step S102. In step S103, the pixel effect range of the line CCD as the light receiving element 41 is set from, for example, set values prestored in the memory 82. In addition, the initial read count of an initial read operation of the line CCD is set.

Note that this initial read operation is an operation for removing unwanted electric charge from the line CCD when the coordinate input apparatus is activated. The line CCD may store unwanted electric charge when not in operation. If the coordinate input operation is executed with this electric charge being stored, detection may become impossible, or a detection error may occur. To avoid this, therefore, a read operation is executed a predetermined number of times in step S104, while the light projecting unit 30 stops projecting light, thereby removing the unwanted electric charge.

In step S104, the read operation of the line CCD is executed. In step S105, whether the read operation is executed the predetermined number of times or more is determined. If the read operation is not executed the predetermined number of times or more (NO in step S105), the process returns to step S104. On the other hand, if the read operation is executed the predetermined number of times or more (YES in step S105), the process advances to step S106.

In step S106, pixel data (Bas_data[N]) of the line CCD in the state in which the light projecting unit 30 stops projecting light is loaded as base data. In step S107, this base data is stored in the memory 82. Then, in step S108, pixel data (Ref_data[N]) of the line CCD in the state in which the light projecting unit 30 is projecting light is loaded as reference data. In step S109, this reference data is stored in the memory 82.

The processing up to this point is the initializing operation when the power supply is turned on. It is, of course, also possible to execute this initializing operation by the intension of an operator by using, for example, a reset switch of the coordinate input apparatus. After this initializing operation, the process advances to a normal coordinate input operation using the pointing tool.

In step S110, a normal loading operation of the line CCD is executed in a coordinate input sampling state, thereby loading pixel data (Norm_data[N]).

In step S111, the difference between the reference data (Ref_data[N]) and pixel data (Norm_data[N]) is calculated. In step S112, the presence/absence of input (a light-shielding portion) by the pointing tool is determined based on this difference and the threshold value Vthr described above. If there is no input (NO in step S112), the process returns to step S110. On the other hand, if there is input (YES in step S112), the process advances to step S113, and the ratio of the change in pixel data is calculated by using equation (2).

In step S114, the trailing edge and leading edge of a pixel data distribution corresponding to the light-shielding range of the pointing tool are detected with respect to the calculated ratio of the change in pixel data. Then, a virtual central pixel number as the center of the light-shielding range is determined by using the detected trailing edge and leading edge and equations (3) to (5).

In step S115, Tan θ is calculated based on the determined central pixel number and the approximate polynomial (equation (7)). In step S116, based on the values of Tan θ for the sensor units 1L and 1R, the input coordinates P(x,y) of the pointing tool are calculated by using equations (7) and (8).

In step S117, the calculated coordinate values are output to the external terminal. This output may be transmitted by serial communication using, for example, a USB interface or RS232C interface, or by wireless communication using, for example, a wireless LAN or Bluetooth.

At the external terminal, a device driver for controlling the coordinate input apparatus interprets the received data, and operates the display screen by moving the cursor and changing the state of a mouse button.

Note that when the processing in step S117 is complete, the process returns to step S110, and the above-mentioned process is repeated until the power supply is turned off or a reset state is set by the intension of the operator. For example, when the period of this repetition is set to about 10 [msec], the coordinate input apparatus can output coordinates pointed by a finger or the pointing tool to an external apparatus or the like at a period of 100 times/sec.

<Explanation of Touch Determination and Proximity Input>

Figure 14A:
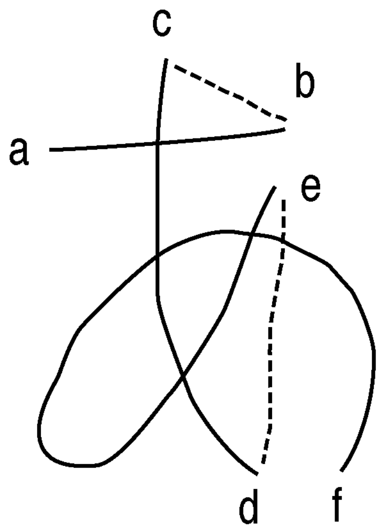
FIG. 14A is a view for explaining the influences of touch determination errors.
Figure 14B:
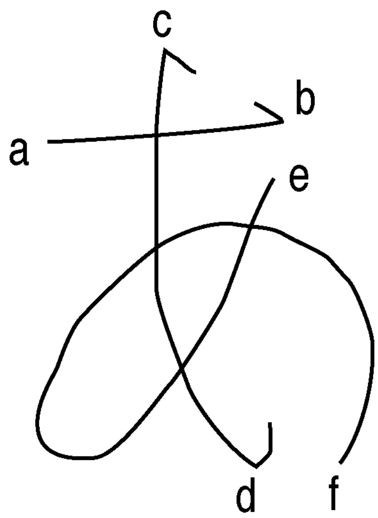
FIG. 14B is a view for explaining the influences of touch determination errors.

The arrangement for calculating a position pointed in the coordinate input effective region 3 by the pointing tool has been explained above. However, the coordinate input apparatus of this kind is required to accurately calculate the pointed position, and accurately determine whether the pointing tool has touched (has come in contact with) the coordinate input surface. That is, when the operator performs an input operation by using the pointing tool, if it is determined by mistake that the pointing tool has touched the coordinate input surface although the pointing tool hasn't touched the input surface, an operation error unintended by the operator occurs (FIGS. 14A and 14B show an example).

In the coordinate input apparatus of this kind as explained with reference to FIGS. 2A to 3B, a bundle of rays is projected along the coordinate input surface, and the direction of the light is detected by shielding it. Accordingly, a state in which the light in the direction is completely shielded (a state in which the light-shielding ratio is 100%) is a state in which the pointing tool is touching the coordinate input surface. In addition, in a state in which the light is not completely shielded but a half of the bundle of rays in the direction is shielded (a state in which the light-shielding ratio is 50%) is a state in which the pointing tool is not touching the coordinate input surface because a half of the light in the direction returns.

In the former state, therefore, the coordinate input apparatus outputs information indicating that the pointing tool is in a touchdown state with the pointed position. In the latter state, the coordinate input apparatus outputs information indicating that the pointing tool is in a touchup state with the pointed position. The latter state is also called a proximity input function. This function is very convenient when, for example, the operator double-clicks a small object displayed on the display device. That is, the operator can display the cursor or the like in the pointed position immediately before touching a small object, and can accurately touch the position of the small object by confirming the difference between the cursor position and the position of the small object.

<Focusing of Light Receiving Optical System and Touch Determination>

In the coordinate input apparatus of the present invention, the retroreflecting member 4 retroreflects the light projected by the light projecting unit 30 in the sensor unit 1L (1R), and the light receiving unit 40 in the sensor unit 1L (1R) detects the retroreflected light. When a pointing operation is performed by the pointing tool, the light is shielded, so the light in that direction cannot be detected any longer. In other words, the light receiving unit 40 senses an image of the shadow of the retroreflecting member 4 in that direction.

Figure 9A:
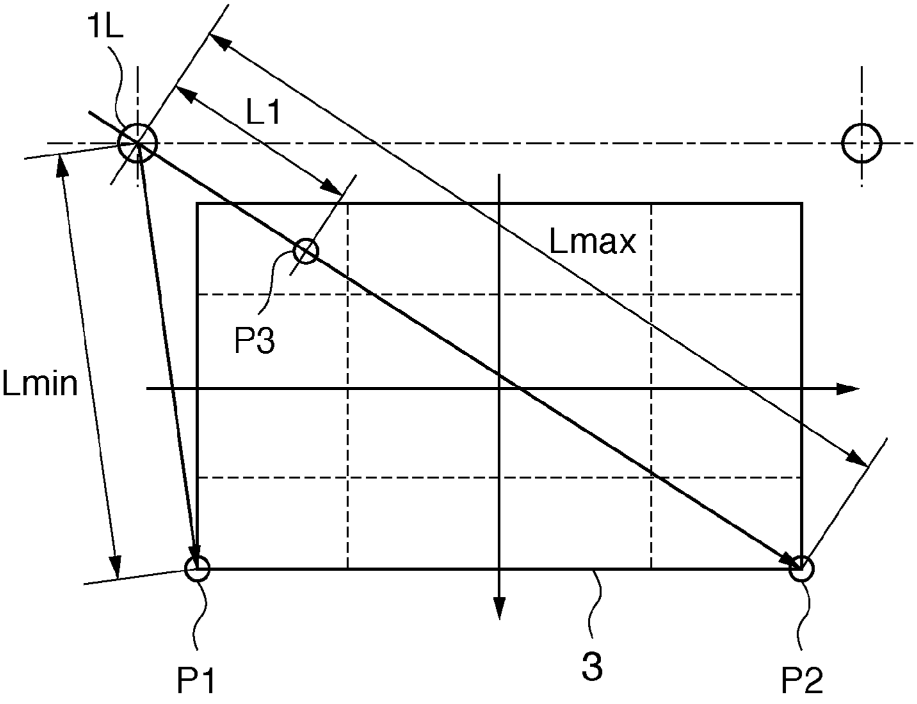
FIG. 9A is a view for explaining focusing and touch determination in the first embodiment.

Assuming that the sensor unit 1L is arranged as shown in FIG. 9A with respect to the coordinate input effective region 3 and the retroreflecting member 4 (not shown) formed around it, points P1 and P2 indicate the positions of the end portions of the coordinate input effective region 3. In this state, at least the coordinate input effective region 3 is the viewing range of the light receiving unit 40 in the sensor unit 1L, and the light receiving unit 40 observes a shadow projected onto the retroreflecting member 4 closely arranged outside the coordinate input effective region 3.

Accordingly, a minimum value of the observation distance is a distance Lmin from the sensor unit 1L to the retroreflecting member 4 in a direction from the sensor unit 1L toward the point P1. Likewise, a maximum distance is a distance Lmax from the sensor unit 1L to the retroreflecting member 4 in a direction from the sensor unit 1L toward the point P2.

That is, the light receiving unit 40 observes a distance range from the observation minimum distance Lmin to the observation maximum distance Lmax. To adjust the focus in this distance range, an optical system having a large depth of field must be constructed, and it is difficult to inexpensively construct an optical system like this.

The following description will be made by assuming that it is difficult to adjust the focus within the whole of this distance range (Lmin to Lmax).

Figure 9B:
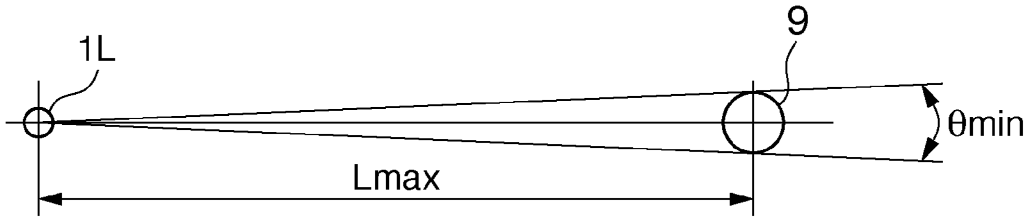
FIG. 9B is a view for explaining focusing and touch determination in the first embodiment.
Figure 9C:
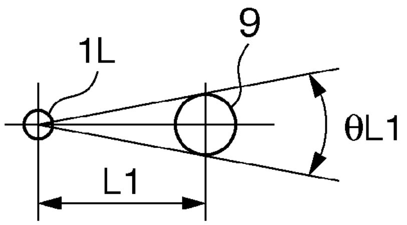
FIG. 9C is a view for explaining focusing and touch determination in the first embodiment.

FIG. 9B shows a state in which the sensor unit 1L observes a shadow formed on the retroreflecting member 4 by a pointing tool 9 at the point P2. In this state, the observation distance is almost Lmax, and the angle range within which the shadow is formed is θmin. This is so because a gap exists between the end portion P2 of the coordinate input effective region 3 and the retroreflecting member 4. On the other hand, when the pointing tool 9 is at a point P3 in the same direction as that of the point P2 when viewed from the sensor unit 1L as shown in FIG. 9A, the angle range within which the shadow is formed is geometrically obtained as θL1 as shown in FIG. 9C. That is, as the observation distance shortens, the angle range within which the shadow is formed widens even for the same pointing tool.

Figure 9D:
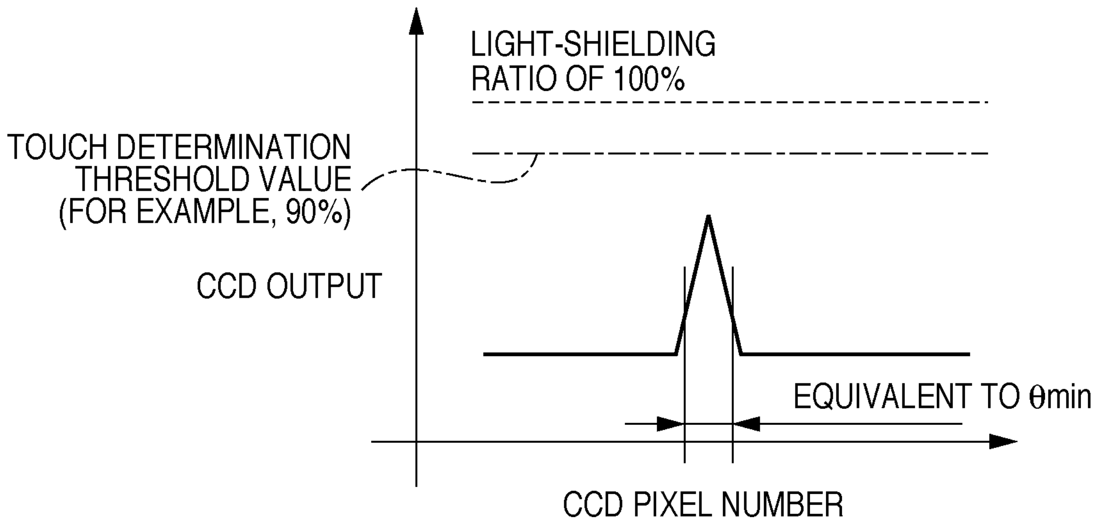
FIG. 9D is a view for explaining focusing and touch determination in the first embodiment.

Assume that the light receiving optical system of the light receiving unit 40 is focused at an intermediate distance between the observation distances Lmin and Lmax. The focus is naturally soft at the distance Lmax (in the direction of the point P2 when viewed from the sensor unit 1L). Even when the pointing tool 9 touches the point P2 (even when the pointing tool 9 completely shields light in that direction), a light-shielding ratio of 100% cannot be observed as shown in FIG. 9D.

Figure 9E:
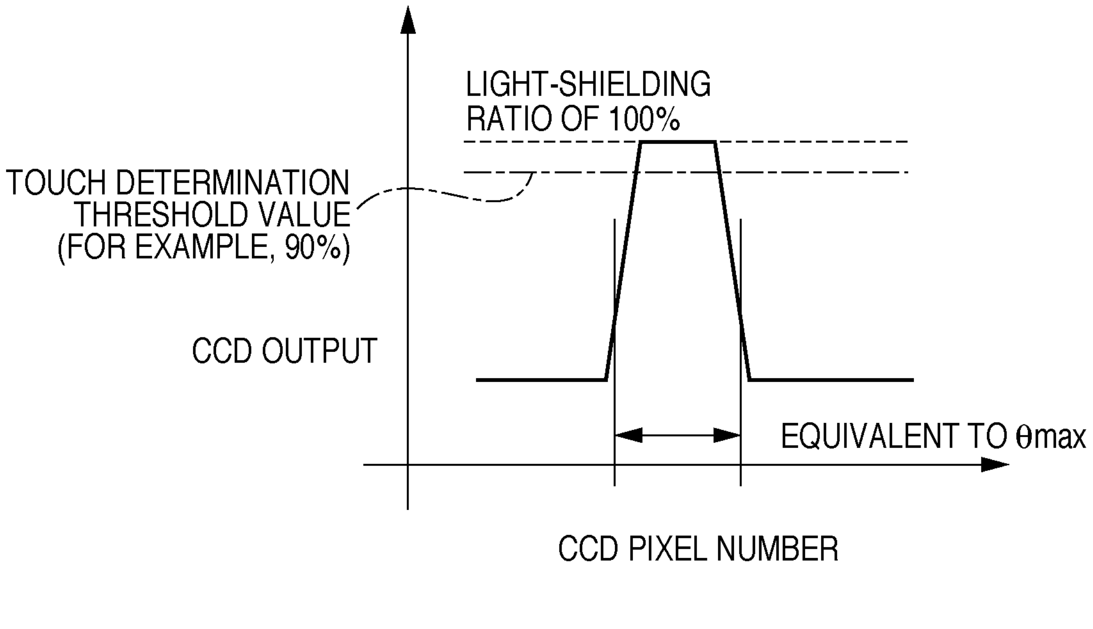
FIG. 9E is a view for explaining focusing and touch determination in the first embodiment.

On the other hand, when the pointing tool 9 touches the point P3 in the same direction as above, a light shielding ratio of 100% can be observed as shown in FIG. 9E. That is, even in the same focusing state, the calculated value of the observed light-shielding ratio changes in accordance with the light-shielding angle range. In other words, even if the focusing state is soft, when the light-shielding angle range is sufficient, it is possible to detect that light in the direction is completely shielded. This makes it possible to accurately determine a touched state.

Note that regardless of whether the pointing tool 9 is at the point P2 or P3, an observation target is the shadow projected onto the retroreflecting member 4, and the observation distance of the light receiving unit 40 is Lmax.

An explanation will be added by referring to FIGS. 9D and 9E again. If a threshold value for touch determination is set at, for example, a light-shielding ratio of 90% or more, it is determined that the state shown in FIG. 9D is an untouched state and the state shown in FIG. 9E is a touched state although both the states are actually touched states. Therefore, because both the states are actually touched states, a determination error occurs, and the operability largely decreases.

On the other hand, assume that the threshold value for touch determination is sufficiently decreased (to, for example, a light-shielding ratio of 40%) so that touch determination is possible even in the state shown in FIG. 9D. When the point P3 is pointed in this state, a determination error indicating a touched state occurs because the threshold value is low, even in a state in which a half of the bundle of rays is shielded (even in an untouched state). That is, the decrease in operability cannot be prevented.

To avoid this problem, it is possible to broaden the light-shielding angle range by sufficiently increasing the diameter of the pointing tool, or construct an optical system having a higher angle detection resolution. The former method decreases the operability because the pointing tool 9 becomes thick, or imposes a limitation that, for example, only a thick finger, that is, the thumb can be used in input. The latter method requires a more expensive optical system, and increases the cost of the apparatus.

Accordingly, the present invention solves this problem by adjusting the focus of the light receiving unit 40 to the maximum value Lmax of the observation distance. That is, when the pointing tool 9 touches the coordinate input surface at the position of the point P2, the light-shielding ratio is detected to be almost 100% because the focus is properly adjusted. When the observation distance becomes shorter than the maximum distance Lmax, the focusing state becomes softer accordingly, but the light-shielding angle range of the pointing tool 9 broadens as explained above. Even in a soft-focus state, therefore, a light-shielding ratio of almost 100% is observed when the pointing tool 9 touches the coordinate input surface. This makes it possible to prevent a determination error described previously.

<Adjustment of Optical Axis of Light Receiving Optical System>

As described above, in order to prevent a touch determination error, the focus must be adjusted at the farthest point distance on the coordinate input effective region 3 from the sensor unit. The adjustment of the optical axis of the light receiving optical system of the light receiving unit 40 including the focus will be explained below with reference to FIGS. 10A to 10C.

Figure 10A:
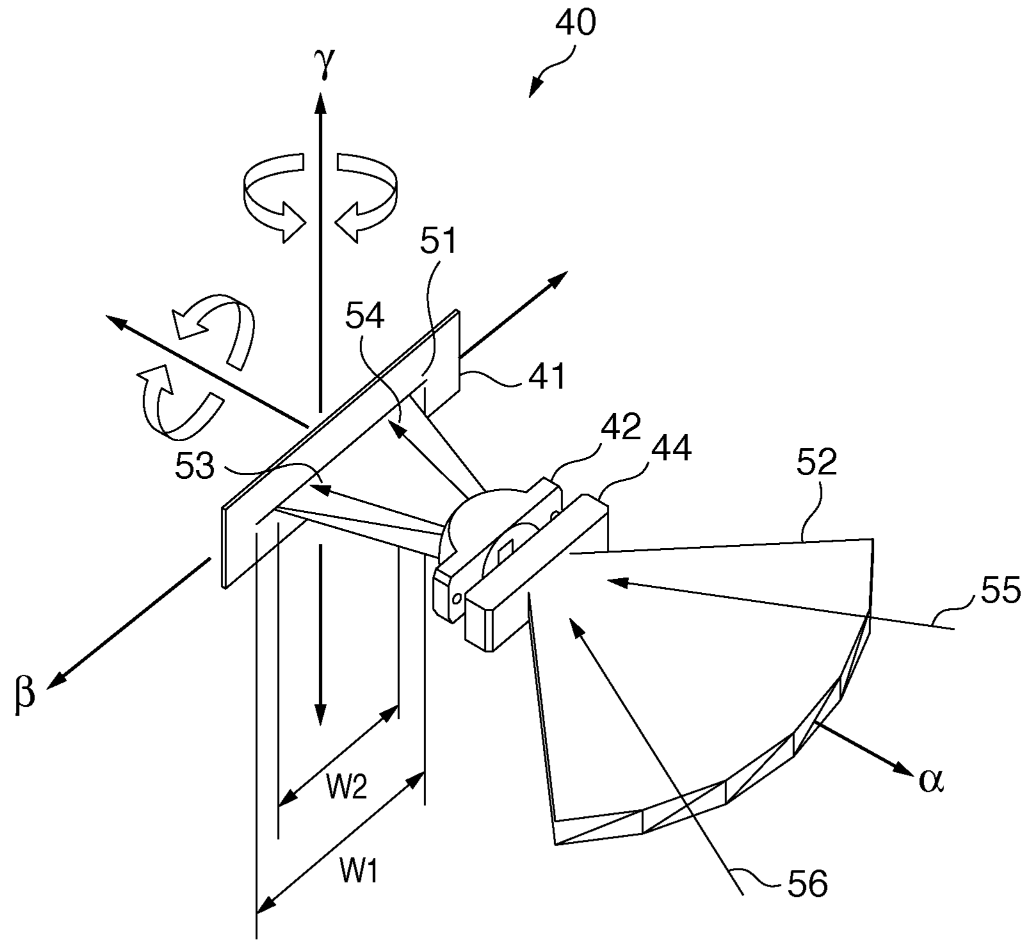
FIG. 10A is a view for explaining optical axis adjustment of the first embodiment.

Referring to FIG. 10A, the light receiving unit 40 includes the light receiving element 41, light receiving lens 42, and infrared filter 44. Reference numeral 51 denotes a photoelectric conversion element array in the light receiving element 41; and 52, a bundle of rays retroreflected by the retroreflecting member 4. The bundle of rays 52 is condensed by the light receiving lens 42, and enters the photoelectric conversion element array 51 in the light receiving element 41.

In the present invention, a line CCD is used as the light receiving element 41, and the light receiving surface of the light receiving element 41 is a $\beta\gamma$ surface. As shown in FIG. 10A, the array direction of the photoelectric conversion element array 51 is a $\beta$-axis, the vertical direction of the photoelectric conversion element array 51 is a $\gamma$-axis, and the normal direction to the $\beta\gamma$ surface is an $\alpha$-axis. To allow the bundle of rays 52 to efficiently enter the photoelectric conversion element array 51 via the light receiving lens 42, it is necessary to adjust the position in the $\gamma$-axis direction, and the rotation around the $\alpha$-axis.

Accordingly, the present invention focuses attention on observation directions 55 and 56. Light in the observation direction 55 forms an image at the position of a point 53 of the photoelectric conversion element array 51, and light in the observation direction 56 forms an image at the position of a point 54. Therefore, adjustment is performed to maximize the output from the light receiving element 41 at each point.

Figure 10B:
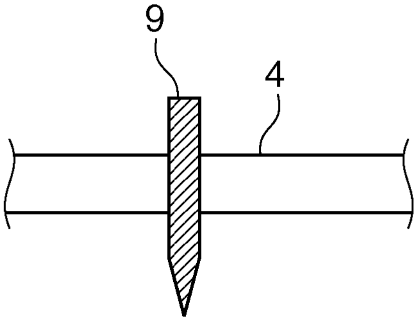
FIG. 10B is a view for explaining optical axis adjustment of the first embodiment.
Figure 10C:
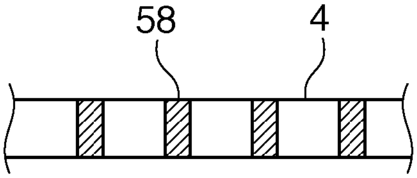
FIG. 10C is a view for explaining optical axis adjustment of the first embodiment.

Subsequently, the focus is adjusted. As shown in FIG. 10B, the retroreflecting member 4 is set at "a distance to be adjusted" in the observation directions 55 and 56, and adjustment is performed by inserting, for example, the pointing tool 9 so that the highest light-shielding ratio is observed. Alternatively, the retroreflecting member 4 set at "the distance to be adjusted" is masked as shown in FIG. 10C, and adjustment is performed to sharpen the mask patterns. By thus performing adjustment, the adjustment of the position in the $\alpha$-axis direction and the rotation around the $\gamma$-axis, that is, the adjustment of the focus is complete.

Note that in the present invention, a line CCD is used as the light receiving element 41, and a length W1 of the photoelectric conversion element array 51 is set larger than a length W2 of light obtained by condensing light in a necessary angle range by an optical system. That is, when the effective angle range is 90° and light in this range is condensed, a margin width of ±2.5 mm is produced in the $\beta$ direction (FIG. 10A) if W2=15 mm and W1=20 mm. This makes it possible to eliminate the adjustment in the $\beta$ direction, thereby simplifying the adjustment process.

In the present invention as described above, the adjustment of the layout of the optical parts is complete by observing detection signals in the two observation directions.

Note that when the light receiving element 41 is an area sensor, it is, of course, necessary to adjust rotation around the $\beta$-axis.

Details of the arrangement of an optical axis adjusting unit (not shown) for adjusting the optical axis will not be described. As described previously, however, as shown in FIG. 10A, the optical axis adjusting unit can perform adjustment by the position in the $\gamma$-axis direction and the rotation around the $\alpha$-axis, and can also perform focus adjustment by the position in the $\alpha$-axis direction and the rotation around the $\gamma$-axis. Accordingly, the optical axis adjusting unit has degrees of freedom in these directions, and the positional relationships are fixed by fixing members such as screws when the adjustment is complete.

<Problems of Optical Axis Adjustment and Measures to the Problems>

As has been described above, to inexpensively manufacture the coordinate input apparatus of this kind, the focus of the light receiving optical system must be adjusted at the farthest point distance in the coordinate input effective region from the position of the optical system. In addition, to perform this adjustment, at least two observation directions are necessary, and observations must simultaneously be performed in the two directions. Furthermore, to exclude defective parts, a testing unit for confirming that good signals are obtained in an entire necessary region is required.

Assuming that the size of the coordinate input effective region of an assumed product is 60 inches and the aspect ratio is 16:9, the dimensions of the effective region are about 1,330×750 mm, and a farthest point distance Lmax60 is about 1,600 mm. Also, assuming that the size is 90 inches and the aspect ratio is 16:9, the dimensions are about 2,000×1,120 mm, and a farthest point distance Lmax90 is about 2,300 mm.

Figure 11:
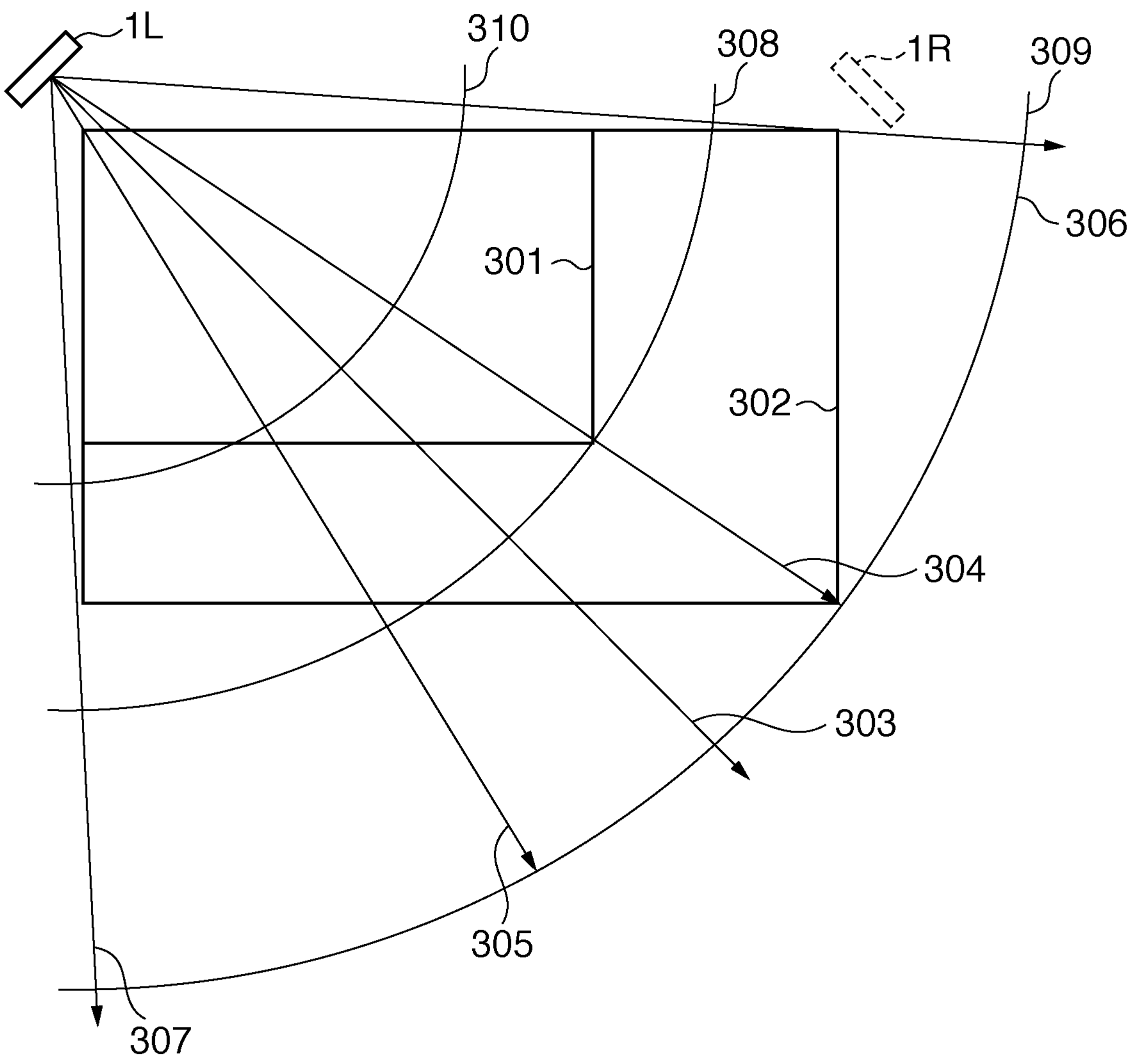
FIG. 11 is a view for explaining the problem of optical axis adjustment of the first embodiment.

FIG. 11 is an exemplary view showing the size of the coordinate input effective region. Reference numeral 301 denotes a range equivalent to a 60-inch coordinate input effective region; and 302, a range equivalent to a 90-inch coordinate input effective region. Reference numeral 308 denotes a circular arc whose radius is the farthest point distance of the 60-inch coordinate input effective region, and the retroreflecting member 4 is formed in this portion. Reference numeral 309 denotes a circular arc whose radius is the farthest point distance of the 90-inch coordinate input effective region, and the retroreflecting member 4 is formed in this portion.

Accordingly, at least two observation directions are necessary, the distance is equivalent to the farthest point distance Lmax, and the size of a tool for performing adjustment increases when the tool is also used as a testing unit. In addition, the tool for optical adjustment requires precise setting which becomes difficult as the size of the tool increases.

If the size of the coordinate input effective region is changed during manufacture, therefore, the setting of the tool must be changed, and the number of setting steps becomes enormous. Although the tool can be set for each coordinate input effective region, the apparatus is large, and it is wasteful to install a plurality of large apparatuses. Furthermore, although the parts forming the sensor units 1L and 1R are common, the sensor units 1L and 1R having undergone optical adjustment are independently managed in accordance with the size of the coordinate input effective region. That is, the sensor units 1L and 1R optically adjusted for the 60-inch coordinate input effective region cannot be used for the 90-inch coordinate input effective region. If these sensor units are used, they cannot sufficiently achieve the performance.

To solve these problems, the present invention adopts the following arrangement.

First, referring to FIG. 11 again, the retroreflecting member 4 is formed in a position at a predetermined distance 310 as a radius (defined as LmaxBase), and two observation directions 304 and 305 are set. That is, the set distance is much shorter than the farthest point distance Lmax. The light transmissive plate 46 having a predetermined thickness d as shown in FIG. 3 is inserted between the optical paths of the light receiving lens 42 and light receiving element 41 of each of the sensor units 1L and 1R adjusted at the distance. The thickness of the light transmissive plate 46 is set by the following equation.

An extension amount A of the light receiving lens 42 from a state in which the lens is focused on infinity to a state in which the lens is focused on a distance R is given by $$\Delta=f\times f/(R-2f)\approx f\times f/R(R>>f) \tag{9}$$

where f is the focal length of the light receiving lens 42. Accordingly, an extension amount ΔLmaxBase at the distance LmaxBase from infinity and an extension amount ΔLmax60 at the farthest point distance in the 60-inch coordinate input effective region from infinity are respectively given by $$\Delta L\text{maxBase}=f\times f/L\text{maxBase} \tag{10}$$

$$\Delta L\text{max}60=f\times f/L\text{max }60 \tag{11}$$

Accordingly, the thickness d of the light transmissive plate for changing the state of the optical system from the focal length LmaxBase to the focal length Lmax60 by inserting the light transmissive plate having a refractive index n is given by $$d=(\Delta L\text{maxBase}-\Delta L\text{max}60)\times n/(n-1) \tag{12}$$

As described above, an optical system having the focal length Lmax60 can be constructed by first adjusting the optical system at the focal length LmaxBase, and then inserting the light transmissive plate having the thickness d calculated by equation (12) into the optical system. That is, a 60-inch coordinate input effective region class sensor unit can be obtained by adjusting the optical system in the same step, and selecting the thickness d equivalent to the focal length Lmax60. Also, a 90-inch coordinate input effective region class sensor unit can be obtained by selecting the thickness d equivalent to the focal length Lmax90.

As has been explained above, the first embodiment can largely decrease the size of the optical axis adjusting tool at the time of production, and can use the same optical adjustment step regardless of the size of an input device. The first embodiment can also improve the productivity, and hence can inexpensively supply the apparatus.

Furthermore, to recover failures on the market, sensor units need not be stocked for different sizes, and it is only necessary to select and attach the light transmissive plate having the thickness d in accordance with the size of the apparatus, so part replacement can be performed as a sensor unit optimum for the size. That is, the light transmissive plate 46 as a small part need only be managed in accordance with the size. This achieves a remarkable effect from the viewpoint of the maintenability as well.

Note that the first embodiment adopts a glass plate as the light transmissive plate 46, but the present invention is not limited to this. For example, a light-transmitting resin such as polycarbonate may also be used. In addition, a line CCD is used as the light receiving element 41, but the present invention is not limited to this. For example, the same effects can be obtained by using an area sensor or the like as the light receiving element 41.

Second Embodiment

In the first embodiment, after the focus is adjusted to the predetermined distance LmaxBase from the sensor unit 1L (1R), the light transmissive plate 46 having the thickness d is attached in accordance with the size of the coordinate input effective region of the coordinate input apparatus, that is, the farthest point distance Lmax from the sensor unit. The performance and quality of coordinate input apparatuses having various sizes can be stabilized by selecting the thickness d of the light transmissive plate 46 to be attached.

As the second embodiment, an arrangement that improves the reliability of touch determination by optimizing the focusing state at the farthest point distance Lmax will be explained below.

As shown in FIGS. 3A and 3B, a light receiving optical system of a sensor unit 1L (1R) is a single-lens condenser optical system using a light receiving lens 42. To correct an optical error such as the aberration of a lens, it is generally necessary to form a plurality of lens optical surfaces, or form a lens surface such as a free-form surface requiring high accuracy. To realize this, the cost increases because the number of parts increases, and a precise manufacturing technique is required. This makes inexpensive manufacture difficult.

Also, as explained with reference to FIGS. 10A to 11, optical adjustment requires observation points in at least two directions (viewing directions) with respect to a light receiving unit 40. When these observation positions in the two directions are arbitrary portions, an in-focus state must be obtained at the same distance in the entire effective viewing range of the light receiving optical system. That is, an optical system in which no focusing error occurs is necessary.

On the other hand, as explained with reference to FIGS. 9A to 9E, in directions other than the direction of the farthest point distance Lmax, the observation distance shortens, and the light-shielding range widens, so even a slight out-of-focus state has no influence on the performance. Accordingly, it is possible to adopt an inexpensive optical system, instead of an expensive optical system in which an in-focus state is obtained at the same distance in all directions, by adjusting the optical system such that an in-focus state is obtained at the farthest point distance Lmax.

As described previously, the arrangement of the present invention requires observation points in at least two directions for optical adjustment. Referring to FIG. 11, a direction 303 is the normal direction to the light receiving surface of a light receiving element 41 in the sensor unit 1L, and a direction 304 is the direction of the farthest point distance Lmax. A direction 305 is the direction of symmetry of the direction 304 with respect to the direction 303 as the normal direction (principal ray direction) to the light receiving unit 40. When the directions 304 and 305 are observation directions, the following remarkable effects can be obtained.

The sensor unit 1R is arranged in a position symmetrical to the sensor unit 1L with respect to a range 302 of the coordinate input effective region. When the adjusted sensor unit 1L is arranged in the position of the sensor unit 1R, the direction 305 during the adjustment is the direction of the farthest point distance of the sensor unit 1R.

That is, of the sensor units adjusted in the same adjustment step, the focus in the direction of the farthest point distance is adjusted in the direction 304 for the sensor unit 1L, and in the direction 305 for the sensor unit 1R.

In the second embodiment as explained above, even when using an inexpensive optical system having an optical error in an effective viewing range, it is possible to eliminate the difference between the left and right sensor units by setting the observation directions as described above, and manufacture a coordinate input apparatus having high reliability by the same manufacturing steps.

Third Embodiment

The first and second embodiments have been explained from the viewpoint of common parts and common optical adjustment by noting focusing and touch determination without depending on the size of the coordinate input effective region of the coordinate input apparatus.

The third embodiment focuses attention on a light amount distribution output from a light receiving unit 40 (light receiving element 41) in accordance with the size of a coordinate input effective region.

Referring to FIG. 11, the product form of a coordinate input effective region having a range 301 and the product form of a coordinate input effective region having a range 302 are different in distance from a sensor unit 1 to a retroreflecting member 4. When conditions such as light projection are the same, therefore, the output signal of the latter is smaller.

Assuming that the output state is optimized in the former state, the signal level decreases in the latter state, and this may decrease the S/N ratio and deteriorate the coordinate calculation performance. On the other hand, if the output state of the latter is optimized, the output of the former becomes excessive and exceeds the dynamic range of the light receiving element 41. As a consequence, the signal is distorted, and a detection error occurs.

To solve these problems, it is conventionally necessary to change the light projection conditions in accordance with the size (for example, an electric current to be supplied to an infrared LED 31 is adjusted in accordance with the size). In the third embodiment, therefore, an arrangement that optimizes focusing and the light amount distribution will be explained.

In FIG. 12A, the same reference numerals as in FIG. 11 denote the same parts, and reference numeral 313 denotes a coordinate input effective region having a size of 60 inches and an aspect ratio of 4:3. A direction 314 indicates the direction of a farthest point distance Lmax at that time.

The output light amount distribution of the sensor unit 1 will be explained below.

As shown in FIGS. 3A and 3B, a light receiving unit 30 includes the infrared LED 31 and a light projecting lens 32. The light emission output of the infrared LED 31 is intense in the optical-axis direction, and the light amount reduces as the angle increases. To indicate the degree, the characteristic is generally defined by a half angle. In FIG. 12A, therefore, the projected light distribution is intense in a direction 303, and the light weakens from the direction 303 toward a direction 307 or 309. Also, the projected light is collimated as a bundle of rays almost parallel to the coordinate input surface. However, this bundle of rays is not completely parallel but diverges as the distance increases.

Accordingly, as the distance to the retroreflecting member 4 increases, the energy of light irradiating the retroreflecting member 4 decreases, and the loss increases. On the other hand, the retroreflection characteristic of the retroreflecting member 4 depends on the angle of incidence to the retroreflecting member 4; as the incident angle increases, the retroreflection efficiency decreases. Therefore, a light amount distribution to be detected by the sensor unit 1 is obtained by the superposition of these factors.

Assume that FIG. 12B shows a light amount distribution optimized in the range 302. Referring to FIG. 12B as explained earlier, output level B is a level at which the light receiving element 41 detects no light, and A indicates a level at which the light intensity is maximum. The output level in the direction 304 shown in FIG. 12B is minimum because although the light from the light projecting unit 30 is intense, the distance to the retroreflecting member 4 is maximum, and the angle of incidence to the retroreflecting member 4 is maximum.

In the direction 307 or 309, the distance is short, and the incident angle improves, but no large output is obtained because the light from the light projecting unit 30 weakens. Accordingly, the peak of the light amount distribution is produced in a direction 311 or 312 as an intermediate point. Note that a maximum output is, of course, generally obtained in the direction 312 because the distance to the retroreflecting member 4 is shorter in the direction 312.

To improve the S/N ratio and stably output coordinates, it is necessary to improve the output level in the direction 304, 307, or 309. To improve the output level, it is only necessary to, for example, increase an electric current to be supplied to the infrared LED 31. In this case, however, the light amount in the direction 311 or 312 also increases and may exceed the detectable range (dynamic range) of the light receiving element 41, and this may distort the signal waveform.

Figure 12D:
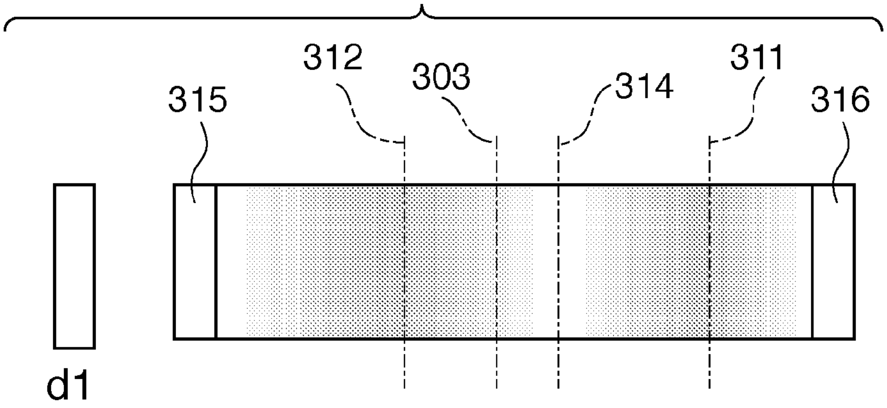
FIG. 12D is a view for explaining the transmittance characteristic of the light transmissive plate of the third embodiment.

In the third embodiment, therefore, a film whose light transmittance changes in accordance with the light receiving direction of the light receiving unit 40 is formed on a light transmissive plate 46. FIG. 12D shows the way the film is formed. Those portions of the light transmissive plate 46 having a thickness d1, which correspond to the positions of the directions 304, 307, and 309, efficiently transmit light, thereby attenuating light in portions in the directions 311 and 312.

With this arrangement, the output level in the direction 304 improves, and the output level in the direction 311 or 312 falls within the dynamic range of the light receiving element 41. This arrangement makes it possible to implement a coordinate input apparatus capable of obtaining stable signals and having high accuracy and high resolution. Note that reference numerals 315 and 316 in FIG. 12D denote portions for bringing the light transmissive plate 46 into contact with an attachment member 49 formed on the sensor unit 1 to attach the light transmissive plate 46 to the sensor unit 1.

Assume that in order to use the range 302 equivalent to a 90-inch coordinate input effective region as an input range, the sensor unit 1 with the light transmissive plate 46 having the thickness d1 shown in FIG. 12D being attached is used as a sensor unit corresponding to a 60-inch coordinate input effective region. In this case, the distance from the light projecting unit 30 to the retroreflecting member 4 naturally shortens. Accordingly, as shown in FIG. 12C, the light amount to be detected increases and distorts the waveform in the directions 311 and 312.

Figure 12E:
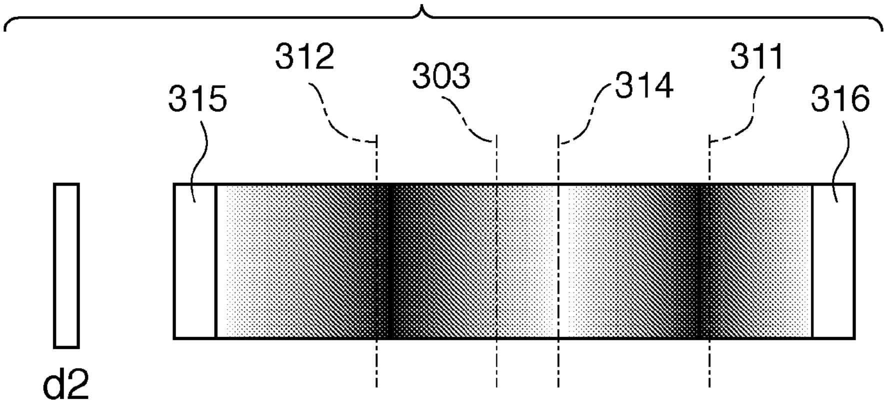
FIG. 12E is a view for explaining the transmittance characteristic of the light transmissive plate of the third embodiment.

To obtain a normal signal waveform shown in FIG. 12B, therefore, the light transmittance of the light transmissive plate 46 to be attached must be decreased as a whole. FIG. 12E shows a state in which the thickness is changed to d2 in order to adjust the focal length, and the light transmittance is decreased. Referring to FIG. 12E, the light transmittance decreases as the density increases. FIG. 12E is depicted more densely than FIG. 12D as a whole.

A range 313 is an example having a coordinate input region aspect ratio different from that of the range 301 but having almost the same farthest point distance Lmax as that of the range 301. Therefore, the thickness of the light transmissive plate 46 to be selected is d2≈d3. However, output signals to be detected are different because the aspect ratios are different, in other words, the distances from the light receiving unit 40 to the retroreflecting member 4 are different.

Figure 12F:
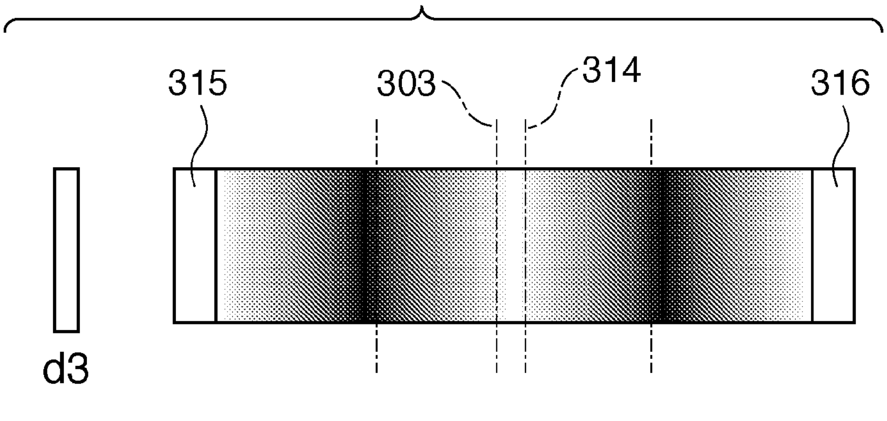
FIG. 12F is a view for explaining the transmittance characteristic of the light transmissive plate of the third embodiment.

Accordingly, the light transmissive plate 46 having an optimized transmittance distribution as shown in FIG. 12F is used instead of the light transmissive plate 46 shown in FIG. 12E. The spacing between the direction 303 as the normal direction and a direction 314 as the farthest point direction in FIG. 12F is obtained by narrowing the spacing between the direction 303 as the normal direction and the direction 304 as the farthest point direction in FIG. 12E.

In the third embodiment as explained above, while optical axis adjustment is performed in the same step, the thickness d of the light transmissive plate is set in accordance with the distance to the farthest point direction, thereby giving a distribution to the transmittance. This makes it possible to absorb a change in light amount distribution due to the size and shape of the coordinate input effective region. Especially when using the light receiving element 41 having a narrow dynamic range, it is possible to calculate highly reliable coordinate values.

Note that as a method of giving a distribution to the transmittance, it is possible to directly print or deposit a film on the light transmissive plate, or attach, for example, a sufficiently thin transparent sheet having a necessary reflectance distribution or diffusivity distribution to the light transmissive plate 46.

Furthermore, the transmittance distribution set in each of FIGS. 12D, 12E, and 12F is not horizontally symmetrical with respect to the direction 303 as the normal direction. Assuming that FIG. 12A shows the transmittance distribution for the sensor unit 1L, this transmittance distribution can be used for the sensor unit 1R by inverting the left and right sides of the light transmissive plate 46 when attaching it. That is, both the right and left sensor units can be obtained by the way of attachment by forming an attachment member capable of inverted attachment. This reduces the cost by the use of common parts.

Fourth Embodiment

In the present invention, after the focus is adjusted to the predetermined distance LmaxBase, the light transmissive plate 46 having the thickness d is attached in accordance with the size of the coordinate input effective region of the coordinate input apparatus, that is, the farthest point distance Lmax. The cost is reduced by using common parts in the sensor unit 1 regardless of the size.

As explained above, in the fourth embodiment, light transmissive plates 46 having different thicknesses d must be attached between a light receiving lens 42 and light receiving element 41. In addition, to use common sensor units as the left and right sensor units 1L and 1R, the light transmissive plate 46 is configured to be attachable/detachable even when the front and rear sides are inverted. Furthermore, stable coordinate detection is possible by preventing the removable of the attached light transmissive plate 46 when in use, preventing a positional deviation of the light transmissive plate 46 caused by vibration or the like, and preventing the vibration of the light transmissive plate 46 itself.

FIGS. 13A and 13B are views for explaining a method of attaching the light transmissive plate 46. FIGS. 13A and 13B are sectional views taken along a direction 303 as the normal direction in FIG. 11.

The same reference numerals as in FIGS. 3A and 3B denote the same parts in FIG. 13A. Reference numeral 47 denotes an upper hood member; and 48, a lower hood member. The upper hood member 47 and lower hood member 48 position an infrared filter 44 and light receiving lens 42, and a bundle of rays enters through the gap formed between them. The position of a light receiving element 41 is adjusted based on the output from it in the observation direction of the incident bundle of rays. After that, the light transmissive plate 46 is attached by using an attachment member 49. The attachment member 49 is an elastic member for pushing the light transmissive plate 46 against an abutting surface 50. As shown in FIG. 13B, when the light transmissive plate 46 is inserted into a predetermined position, the attachment member 49 deforms and holds the light transmissive plate 46. The attachment member 49 is molded together with the upper hood member 47. However, it is also possible to push the light transmissive plate 46 by using, for example, a spring member.

When the light transmissive plate 46 is attached to the predetermined position, as shown in FIGS. 12D, 12E, and 12F, the attachment member 49 pushes the light transmissive plate 46 in positions corresponding to directions 315 and 316.

Furthermore, in the fourth embodiment, when the sensor unit 1 to which the light transmissive plate 46 is attached as shown in FIG. 13B is mounted on the coordinate input apparatus main body, a main body projecting portion (not shown) abuts against the light transmissive plate 46 so as to prevent its removal. However, the present invention is, of course, not limited to this, and it is also possible to attach a lid-like member.

In the fourth embodiment as has been explained above, the attachment member 49 formed as described above makes it possible to attach the light transmissive plates 46 having various thicknesses selected in accordance with the product specifications.

Also, common sensor units can be used as the left and right sensor units 1 by inverting the front and rear sides of the light transmissive plate 46, and various sizes can be realized by changing the thickness d or optimizing the transmittance distribution of the light transmissive plate 46. The apparatus type can be changed during manufacture by only replacing the light transmissive plate 46, and the light transmissive plate 46 can be replaced as a service part in the event of a failure. Therefore, it is important to make the light transmissive plate 46 replaceable.

In the state shown in FIG. 13B, the light transmissive plate 46 is pushed by only the elastic force, and hence can be detached by, for example, inserting a thin plate from side A.

In the fourth embodiment as has been explained above, it is possible to accurately determine whether the coordinate input surface is touched by a pointing tool such as a finger. Accordingly, a coordinate input apparatus having high operability and high reliability can be implemented.

Also, sensor units can be manufactured in the same optical axis adjustment step regardless of the size of a target coordinate input apparatus. This makes it possible to simplify the manufacturing process and use common parts. Furthermore, even when manufacturing a large-sized coordinate input apparatus, a small optical axis adjustment tool can be used, and this helps increase the space efficiency.

Note that the optical light shielding method using the retroreflecting member has been explained as a main embodiment in the first to fourth embodiments, but the present invention is not limited to this. For example, even when using a method using light emission by a pen or a method of directly sensing an image of a finger by using a camera, the same effect can be obtained by appropriately setting the thickness of the light transmissive plate in accordance with the coordinate input effective region. That is, when using the method using light emission by a pen, the present invention can be practiced by adopting a sensor unit not including the light projecting unit 30. Also, when using the method of directly sensing an image of a finger by using a camera, the present invention can be practiced by replacing the light receiving unit 40 with an image sensing unit, and arranging the light transmissive plate in front of the image sensing unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-150253, filed on Jun. 30, 2010, which is hereby incorporated by reference herein in its entirety.

What is claimed is:

1. A coordinate input apparatus comprising:

a reflection unit formed in a peripheral portion of a coordinate input effective region, and adapted to retroreflect incident light;

a light projection unit adapted to project light toward the coordinate input effective region; and a light receiving unit formed at a corner of the coordinate input effective region, coordinate values of a pointed position being calculated based on a light amount distribution obtained by said light receiving unit, wherein said light receiving unit comprises at least:

a light receiving element;

a light receiving lens;

an adjusting unit adapted to adjust a positional relationship between said light receiving element and said light receiving lens; and a light transmissive plate arranged between said light receiving element and said light receiving lens as well as arranged on an optical path of said light receiving element and said light receiving lens, and adapted to define a focal length of said light receiving lens, and said light transmissive plate is arranged on the optical path of said light receiving element and said light receiving lens in a state in which an optical axis between said light receiving element and said light receiving lens is adjusted by said adjusting unit with said light transmissive plate being removed; and said focal length of the light receiving lens is defined by setting the light transmittance of the light transmissive plate.

2. The apparatus according to claim 1, wherein a thickness of said light transmissive plate is selected such that a focus of said light receiving unit is adjusted to a farthest point distance of the coordinate input effective region from a position of said light receiving unit within a viewing range of said light receiving unit.

3. The apparatus according to claim 1, wherein said light receiving unit further comprises an attaching unit adapted to attach said light transmissive plate having a thickness corresponding to a size of the coordinate input effective region.

4. The apparatus according to claim 1, wherein said light receiving unit further comprises an attaching unit adapted to attach or detach said light transmissive plate having a thickness corresponding to a size of the coordinate input effective region.

5. The apparatus according to claim 1, wherein a light transmittance of said light transmissive plate is different in accordance with a light receiving direction of said light receiving unit.

6. The apparatus according to claim 1, further comprising an attaching unit adapted to attach or detach said light transmissive plate by inverting said light transmissive plate in a viewing direction of said light receiving unit.

7. A light receiving apparatus of an optical coordinate input apparatus, comprising:

a light receiving element;

a light receiving lens;

an adjusting unit adapted to adjust a positional relationship between said light receiving element and said light receiving lens; and a light transmissive plate arranged between said light receiving element and said light receiving lens as well as arranged on an optical path of said light receiving element and said light receiving lens, and adapted to define a focal length of said light receiving lens, wherein said light transmissive plate is arranged on the optical path of said light receiving element and said light receiving lens in a state in which an optical axis between said light receiving element and said light receiving lens is adjusted by said adjusting unit with said light transmissive plate being removed;

said focal length of the light receiving lens is defined by setting the light transmittance of the light transmissive plate.

8. A method of manufacturing a light receiving apparatus of an optical coordinate input apparatus by a manufacturing apparatus, comprising:

in said manufacturing apparatus, an adjustment step of adjusting an optical axis between a light receiving element and light receiving lens of the light receiving apparatus, as adjustment of a positional relationship between the light receiving element and the light receiving lens, such that a focus is adjusted to a distance shorter than a farthest point distance of a coordinate input effective region of the coordinate input apparatus from the light receiving apparatus within a viewing range of the light receiving apparatus; and in said manufacturing apparatus, an attaching step of attaching, between the light receiving element and the light receiving lens as well as arranged on an optical path of said light receiving element and said light receiving lens, a light transmissive plate having a thickness with which a focus of the light receiving apparatus is adjusted to the farthest point distance within the viewing range of the light receiving apparatus, after the adjustment step, wherein said focal length of the light receiving lens is defined by setting the light transmittance of the light transmissive plate.

9. The method according to claim 8, wherein in the adjustment step, the optical axis between the light receiving element and the light receiving lens is adjusted in at least two directions, that is, a direction from the light receiving apparatus to the farthest point distance in the coordinate input effective region, and a direction symmetrical to the direction to the farthest point distance with respect to a principal ray direction of the light receiving apparatus.

* * * * *